US010904556B2

(12) United States Patent
Sugio et al.

(10) Patent No.: US 10,904,556 B2
(45) Date of Patent: Jan. 26, 2021

(54) MOVING PICTURE CODING METHOD AND MOVING PICTURE DECODING METHOD USING A DETERMINATION WHETHER OR NOT A REFERENCE BLOCK HAS TWO REFERENCE MOTION VECTORS THAT REFER FORWARD IN DISPLAY ORDER WITH RESPECT TO A CURRENT PICTURE

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 72 days.

(21) Appl. No.: 16/253,374

(22) Filed: Jan. 22, 2019

(65) Prior Publication Data
US 2019/0158867 A1 May 23, 2019

Related U.S. Application Data

(63) Continuation of application No. 14/707,407, filed on May 8, 2015, now Pat. No. 10,237,569, which is a
(Continued)

(51) Int. Cl.
*H04N 19/513* (2014.01)
*H04N 19/52* (2014.01)
(Continued)

(52) U.S. Cl.
CPC .......... *H04N 19/513* (2014.11); *H04N 19/31* (2014.11); *H04N 19/52* (2014.11); *H04N 19/573* (2014.11)

(58) Field of Classification Search
CPC ...... H04N 19/513; H04N 19/31; H04N 19/52; H04N 19/573
See application file for complete search history.

(56) References Cited

U.S. PATENT DOCUMENTS 6,611,559 B1 * 8/2003 Shingo .................. H04N 5/145
348/E5.066
6,690,724 B1 2/2004 Kadono
(Continued)

FOREIGN PATENT DOCUMENTS

CN 1415171 4/2003
CN 1525762 9/2004
(Continued)

OTHER PUBLICATIONS

ITU-T H.264, "Advanced video coding for generic audiovisual services", Mar. 2010.
(Continued)

*Primary Examiner* — Joseph Suh
(74) *Attorney, Agent, or Firm* — Wenderoth, Lind & Ponack, L.L.P.

(57) ABSTRACT

A moving picture coding apparatus includes: an inter prediction control unit which determines to code a motion vector using, among candidate predicted motion vectors, a candidate predicted motion vector having the least error with relative to a motion vector derived by motion estimation; a picture type determination unit which generates picture type information; a temporal direction vector calculation unit which derives a candidate predicted motion vector in temporal direct; and a co-located reference direction determination unit which generates, for each picture, a co-located reference direction flag.

2 Claims, 33 Drawing Sheets

Related U.S. Application Data continuation of application No. 13/347,721, filed on Jan. 11, 2012, now Pat. No. 9,083,981.

(60) Provisional application No. 61/431,883, filed on Jan. 12, 2011.

(51) Int. Cl.
*H04N 19/31* (2014.01)
*H04N 19/573* (2014.01)

(56) References Cited

U.S. PATENT DOCUMENTS

| | | | |
|---|---|---|---|
| 7,233,621 B2 | 6/2007 | Jeon | |
| 7,733,960 B2 | 6/2010 | Kondo et al. | |
| 7,782,936 B2 | 8/2010 | Kondo et al. | |
| 7,894,526 B2 | 2/2011 | Kadono et al. | |
| 7,970,058 B2 | 6/2011 | Suzuki | |
| 8,345,758 B2 | 1/2013 | Jeon | |
| 8,462,852 B2 | 6/2013 | Xu et al. | |
| 8,463,058 B2 | 6/2013 | Jeon et al. | |
| 8,537,897 B2 | 9/2013 | Lee et al. | |
| 8,630,348 B2 | 1/2014 | Jeon | |
| 8,929,453 B2 | 1/2015 | Kondo et al. | |
| 8,958,480 B2 | 2/2015 | Kondo et al. | |
| 8,964,848 B2 | 2/2015 | Kondo et al. | |
| 9,008,181 B2 | 4/2015 | Chen et al. | |
| 2002/0181579 A1* | 12/2002 | Vetro | H04N 19/90 375/240 |
| 2003/0215014 A1* | 11/2003 | Koto | H04N 19/132 375/240.16 |
| 2004/0008784 A1* | 1/2004 | Kikuchi | H04N 19/51 375/240.16 |
| 2004/0017851 A1* | 1/2004 | Haskell | H04N 19/146 375/240.16 |
| 2004/0052507 A1 | 3/2004 | Kondo et al. | |
| 2004/0057518 A1* | 3/2004 | Knee | H04N 19/51 375/240.16 |
| 2004/0066848 A1* | 4/2004 | Jeon | H04N 19/503 375/240.15 |
| 2004/0086044 A1 | 5/2004 | Kondo et al. | |
| 2004/0136461 A1* | 7/2004 | Kondo | H04N 19/573 375/240.16 |
| 2004/0146109 A1* | 7/2004 | Kondo | H04N 19/577 375/240.16 |
| 2004/0146110 A1* | 7/2004 | Bjontegaard | H04N 19/52 375/240.16 |
| 2004/0190615 A1 | 9/2004 | Abe et al. | |
| 2004/0218674 A1* | 11/2004 | Kondo | H04N 19/513 375/240.16 |
| 2004/0233988 A1 | 11/2004 | Kadono et al. | |
| 2004/0234143 A1 | 11/2004 | Hagai et al. | |
| 2004/0268266 A1* | 12/2004 | Slotznick | G09B 7/00 715/812 |
| 2005/0013497 A1* | 1/2005 | Hsu | H04N 19/102 382/239 |
| 2005/0053147 A1* | 3/2005 | Mukerjee | H04N 19/11 375/240.16 |
| 2005/0129125 A1* | 6/2005 | Cha | H04N 19/176 375/240.16 |
| 2005/0141612 A1* | 6/2005 | Abe | H04N 19/103 375/240.16 |
| 2005/0152452 A1 | 7/2005 | Suzuki | |
| 2005/0185713 A1 | 8/2005 | Winger et al. | |
| 2006/0153300 A1* | 7/2006 | Wang | H04N 19/46 375/240.16 |
| 2006/0198445 A1 | 9/2006 | Li et al. | |
| 2007/0025444 A1* | 2/2007 | Okada | H04N 19/17 375/240.16 |
| 2007/0036218 A1 | 2/2007 | Burazerovic | |
| 2007/0071107 A1 | 3/2007 | Ha | |
| 2007/0076795 A1 | 4/2007 | Lee | |
| 2007/0104379 A1* | 5/2007 | Kim | H04N 19/61 382/238 |
| 2007/0110156 A1 | 5/2007 | Ji et al. | |
| 2007/0154103 A1 | 7/2007 | Au et al. | |
| 2007/0183499 A1* | 8/2007 | Kimata | H04N 19/523 375/240.16 |
| 2007/0211802 A1 | 9/2007 | Kikuchi et al. | |
| 2007/0217510 A1 | 9/2007 | Yamori et al. | |
| 2008/0031341 A1 | 2/2008 | Jeon | |
| 2008/0037636 A1 | 2/2008 | Jeon et al. | |
| 2008/0037646 A1 | 2/2008 | Jeon et al. | |
| 2008/0063060 A1 | 3/2008 | Kondo et al. | |
| 2008/0063061 A1 | 3/2008 | Kondo et al. | |
| 2008/0063071 A1 | 3/2008 | Suzuki | |
| 2008/0063072 A1 | 3/2008 | Suzuki | |
| 2008/0063075 A1 | 3/2008 | Kondo et al. | |
| 2008/0069225 A1 | 3/2008 | Suzuki | |
| 2008/0069231 A1 | 3/2008 | Kondo et al. | |
| 2008/0069232 A1 | 3/2008 | Kondo et al. | |
| 2008/0075171 A1 | 3/2008 | Suzuki | |
| 2008/0117979 A1* | 5/2008 | Kondo | H04N 19/513 375/240.16 |
| 2008/0240247 A1* | 10/2008 | Lee | H04N 19/573 375/240.16 |
| 2008/0267292 A1* | 10/2008 | Ito | H04N 19/52 375/240.16 |
| 2009/0041124 A1* | 2/2009 | Ohgose | H04N 19/112 375/240.16 |
| 2009/0059068 A1 | 3/2009 | Hanaoka et al. | |
| 2009/0074069 A1 | 3/2009 | Jeon | |
| 2009/0110075 A1* | 4/2009 | Chen | H04N 19/523 375/240.16 |
| 2009/0116759 A1* | 5/2009 | Suzuki | H04N 19/61 382/238 |
| 2009/0190660 A1* | 7/2009 | Kusakabe | H04N 19/139 375/240.13 |
| 2009/0207914 A1 | 8/2009 | Choi et al. | |
| 2009/0290642 A1* | 11/2009 | Ohgose | H04N 19/46 375/240.16 |
| 2010/0079605 A1 | 4/2010 | Wang et al. | |
| 2010/0195723 A1 | 8/2010 | Ikai et al. | |
| 2010/0202539 A1* | 8/2010 | Kondo | H04N 19/103 375/240.16 |
| 2010/0208817 A1 | 8/2010 | Jeon et al. | |
| 2010/0223239 A1* | 9/2010 | Madsen | G11B 27/105 707/695 |
| 2010/0316127 A1* | 12/2010 | Yokoyama | H04N 19/176 375/240.16 |
| 2011/0002389 A1 | 1/2011 | Xu et al. | |
| 2011/0002392 A1 | 1/2011 | Park et al. | |
| 2011/0038420 A1 | 2/2011 | Lee et al. | |
| 2011/0080954 A1 | 4/2011 | Bossen et al. | |
| 2011/0085593 A1 | 4/2011 | Wang et al. | |
| 2011/0090964 A1 | 4/2011 | Xu et al. | |
| 2011/0150095 A1 | 6/2011 | Choi et al. | |
| 2011/0176612 A1* | 7/2011 | Tsai | H04N 19/172 375/240.16 |
| 2011/0182362 A1 | 7/2011 | Kim et al. | |
| 2012/0008688 A1 | 1/2012 | Tsai et al. | |
| 2012/0093217 A1 | 4/2012 | Jeon et al. | |
| 2012/0106634 A1* | 5/2012 | Jeon | H04N 19/105 375/240.12 |
| 2012/0128060 A1 | 5/2012 | Lin et al. | |
| 2012/0147966 A1 | 6/2012 | Lee et al. | |
| 2012/0155542 A1 | 6/2012 | Lee et al. | |
| 2012/0189055 A1 | 7/2012 | Chien et al. | |
| 2012/0189058 A1 | 7/2012 | Chen et al. | |
| 2012/0195368 A1 | 8/2012 | Chien et al. | |
| 2012/0207219 A1* | 8/2012 | Someya | H04N 19/597 375/240.16 |
| 2012/0230392 A1 | 9/2012 | Zheng et al. | |
| 2012/0269268 A1 | 10/2012 | Kim et al. | |
| 2012/0275518 A1 | 11/2012 | Kadono et al. | |
| 2012/0281764 A1 | 11/2012 | Lee et al. | |
| 2012/0328024 A1 | 12/2012 | Kondo et al. | |
| 2013/0279594 A1 | 10/2013 | Lee et al. | |
| 2013/0336401 A1 | 12/2013 | Jeon | |
| 2013/0336402 A1 | 12/2013 | Xu et al. | |

(56) References Cited

U.S. PATENT DOCUMENTS

| | | |
|---|---|---|
| 2017/0111637 A1 | 4/2017 | Jeon et al. |
| 2017/0324976 A1 | 11/2017 | Kondo et al. |
| 2018/0234696 A1 | 8/2018 | Kadono et al. |

FOREIGN PATENT DOCUMENTS

| | | |
|---|---|---|
| CN | 101039433 | 9/2007 |
| CN | 101090491 | 12/2007 |
| EP | 1 331 826 | 7/2003 |
| EP | 1 411 729 | 4/2004 |
| EP | 1 503 599 | 2/2005 |
| JP | 2003-333600 | 11/2003 |
| JP | 2004-023458 | 1/2004 |
| JP | 2004-129191 | 4/2004 |
| JP | 2004-208258 | 7/2004 |
| JP | 2004-208259 | 7/2004 |
| JP | 2009-201112 | 9/2009 |
| JP | 5020829 | 9/2012 |
| WO | 2004/008775 | 1/2004 |
| WO | 2007/074543 | 7/2007 |

OTHER PUBLICATIONS

International Search Report dated Apr. 24, 2012 in International (PCT) Application No. PCT/JP2012/000131.

"Test Model under Consideration Output Document", (draft007), Joint Collaborative Team on Video Coding (JCT-VC) of ITU-T SG16 WP3 and ISO/IEC JTC1/SC29/WG11, $2^{nd}$ Meeting: Geneva, CH, JCTVC-B205, Oct. 2010, pp. 1-14, 26, 27, 35-39, 53, 61-64, and 78-93.

Byeong-Moon Jeon, "Direct mode in B pictures", Joint Video Team (JVT) of ISO/IEC MPEG and ITU-T VCEG (ISO/IEC JTC1/SC29/WG11 and ITU-T SG16 Q.6), $4^{th}$ Meeting: Klagenfurt, Austria, Contribution: JVT-D056, Jul. 2002.

Jiali Zheng et al., "Extended Direct Mode for Hierarchical B Picture Coding", Conference on Image Processing, Sep. 11, 2005, vol. 2, pp. II-265-II-268.

Joel Jung and Guillaume Laroche, "Competition-Based Scheme for Motion Vector Selection and Coding", ITU-Telecommunications Standardization Sector STUDY GROUP 16 Question 6 Video Coding Experts Group (VCEG), $29^{th}$ Meeting: Klagenfurt, Austria, VCEG-AC06, Jul. 2006.

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3rd Meeting: Guangzhou, CN, Oct. 7-15, 2010.

Toshiyasu Sugio et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, JCTVC-D274, $4^{th}$ Meeting: Daegu, KR, Jan. 2011, pp. 1-7.

Jian-Liang Lin et al., "Improved Advanced Motion Vector Prediction", Joint Collaborative Team on Video Coding (JCT-VC) of ITU-T SG16 WP3 and ISO/IEC JTC1/SC29/WG11, JCTVC-D125_r2, $4^{th}$ Meeting: Daegu, KR, Jan. 2011, pp. 1-8.

Toshiyasu Sugio et al., "Modified derivation process of temporal motion vector predictor", Joint Collaborative Team on Video Coding (JCT-VC) of ITU-T SG16 WP3 and ISO/IEC JTC1/SC29/WG11, $4^{th}$ Meeting: Daegu, KR, Jan. 2011, JCTVC-D273, pp. 1-4.

Draft of Version 4 of ISO/IEC 14496-10, Joint Video Team (JVT) of ISO/IEC MPEG & ITU-T VECG (ISO/IEC JTC1/SC29/WG11 and ITU T SG16 Q.6), $14^{th}$ Meeting: Hong Kong, CN, Jan. 18-21, 2005, Document: JVT-N050d1, Filename: JVT-N050dl.doc, Jan. 28, 2005, pp. 105-106.

Triceps corporation, "Jisedai Dougazou Fugouka Houshiki (Next Generation Video Coding Method)", MPEG-4 AVC | H.264, Mar. 12, 2004, pp. 64-66 (Chapter 6.2 to 7) and its partial translation.

ITU-T H.264, Telecommunication Standardization Sector of ITU, Series H: Audiovisual and Multimedia Systems Infrastructure of audiovisual services—Coding of moving video, Advanced video coding for generic audiovisual services, Mar. 2010.

J. Jung et al., "TE11: Report on experiment 3.3.b: 'temporally oriented' set of predictors for MV-Competition", Joint Collaborative Team on Video Coding (JCT-VC) of ITU-T SG16 WP3 and ISO/IEC for JTC1/SC29/WG11 $3^{rd}$ Meeting: Guangzhou, CN, Document: JCTVC-C291, ITU-T, Oct. 2010.

International Search Report dated Mar. 6, 2012 in corresponding International Application No. PCT/JP2011/006641.

"Test Model under Consideration", Output Document (draft005), Joint Collaborative Team on Video Coding (JCT-VC) of ITU-T SG16 WP3 and ISO/IEC JTC1/SC29/WG11, JCTVC-B205, $2^{nd}$ Meeting: Geneva, CH, Sep. 2010, pp. 1-6, and 82-96.

International Search Report dated May 29, 2012 in corresponding International Application No. PCT/JP2012/001389.

Toshiyasu Sugio et al., "CE9: Experiment A, I, J and S Modified derivation process of reference index for skip mode and temporal motion vector predictor", Joint Collaborative Team on Video Coding (JCT-VC) of ITU-T SG16 WP3 and ISO/IEC JTC1/SC29/WG11, $5^{th}$ Meeting: Geneva, CH, Mar. 2011, JCTVC-E230, pp. 1-6.

International Search Report dated Feb. 7, 2012 in corresponding International Application No. PCT/JP2011/006517.

Extended European Search Report dated May 20, 2014 in European Application No. 12734216.0.

Guillaume Laroche et al., "RD Optimized Coding for Motion Vector Predictor Selection", IEEE Transactions on Circuits and Systems for Video Technology, vol. 18, No. 9, Sep. 2008, pp. 1247-1257.

Anonymous, "H.264 Syntax", The H.264 Advanced Video Compression Standard, 2nd Edition, Chapter 5, Apr. 2010.

Joel Jung et al., "Competition-Based Scheme for Motion Vector Selection and Coding", ITU-Telecommunications Standardization Sector, Video Coding Experts Group (VCEG), VCEG-AC06rl, 29th Meeting: Klagenfurt, Austria, Jul. 17-18, 2006.

Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6), JVT-D056, $4^{th}$ Meeting: Klagenfurt, Austria, Jul. 22-26, 2002, pp. 1-10.

Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6), JVT-D056, $4^{th}$ Meeting: Klagenfurt, Austria, Jul. 22-26, 2002, pp. 1-7.

Frank Bossen et al., "Simplified motion vector coding method", Joint Collaborative Team on Video Coding (JCT-VC) of ITU-T SG16 WP3 and ISO/IEC JTC1/SC29/WG11, JCTVC-B094, $2^{nd}$ Meeting: Geneva, CH, Jul. 21-28, 2010.

"Test Model under Consideration", Joint Collaborative Team on Video Coding (JCT-VC) of ITU-T SG16 WP3 and ISO/IEC JTC1/SC29/WG11, 1st Meeting: Dresden, DE, Jul. 18, 2010, [JCTVC-A205], pp. 39, 74-75.

Extended European Search Report dated Mar. 16, 2016 in European Patent Application No. 11843582.5.

Office Action dated Jun. 24, 2016 in U.S. Appl. No. 13/985,315.
Office Action dated Nov. 3, 2016 in U.S. Appl. No. 14/957,886.
Office Action dated Feb. 28, 2017 in U.S. Appl. No. 14/856,965.
Office Action dated Apr. 21, 2017 in U.S. Appl. No. 13/985,315.
Office Action dated Nov. 16, 2017 issued for U.S. Appl. No. 13/985,315.
Office Action dated Mar. 2, 2018 issued for U.S. Appl. No. 15/790,374.
Office Action dated Nov. 9, 2018 issued for U.S. Appl. No. 13/985,315.

\* cited by examiner

| Predicted motion vector index | Predicted motion vector candidate |
|---|---|
| 0 | Median (MV_A, MV_B, MV_C) |
| 1 | MV_A |
| 2 | MV_B |
| 3 | MV_C |
| 4 | Temporal direct vector 1 |
| 5 | Temporal direct vector 2 |

FIG. 6

| Predicted motion vector index | Assigned bitstream |
|---|---|
| 0 | 0 |
| 1 | 10 |
| 2 | 110 |
| 3 | 1110 |
| 4 | 11110 |
| 5 | 111110 |

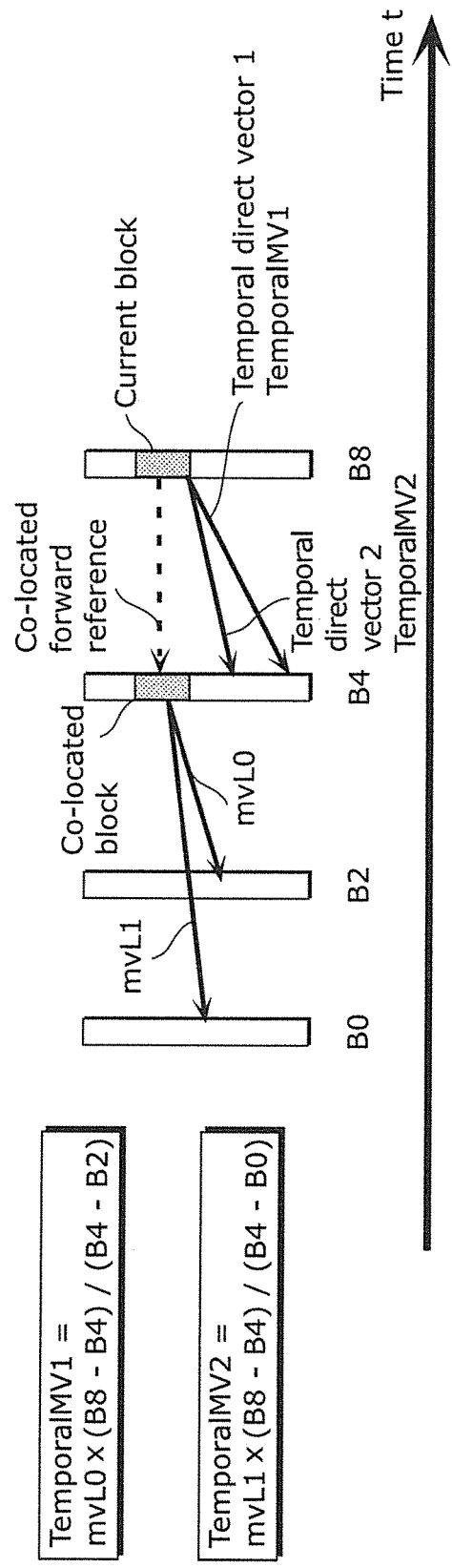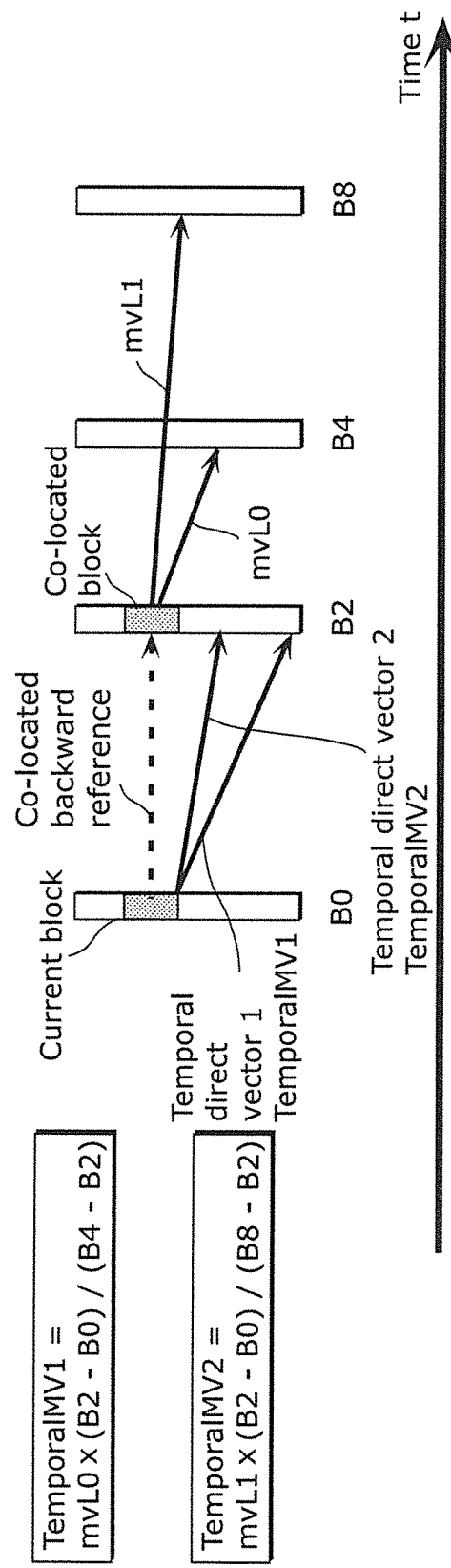

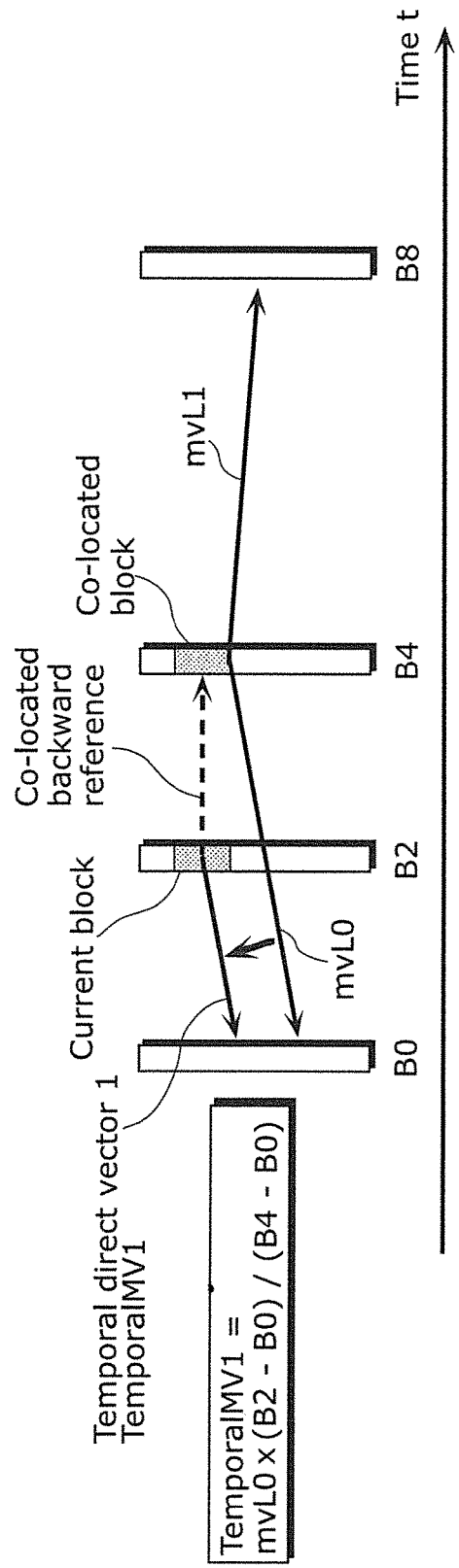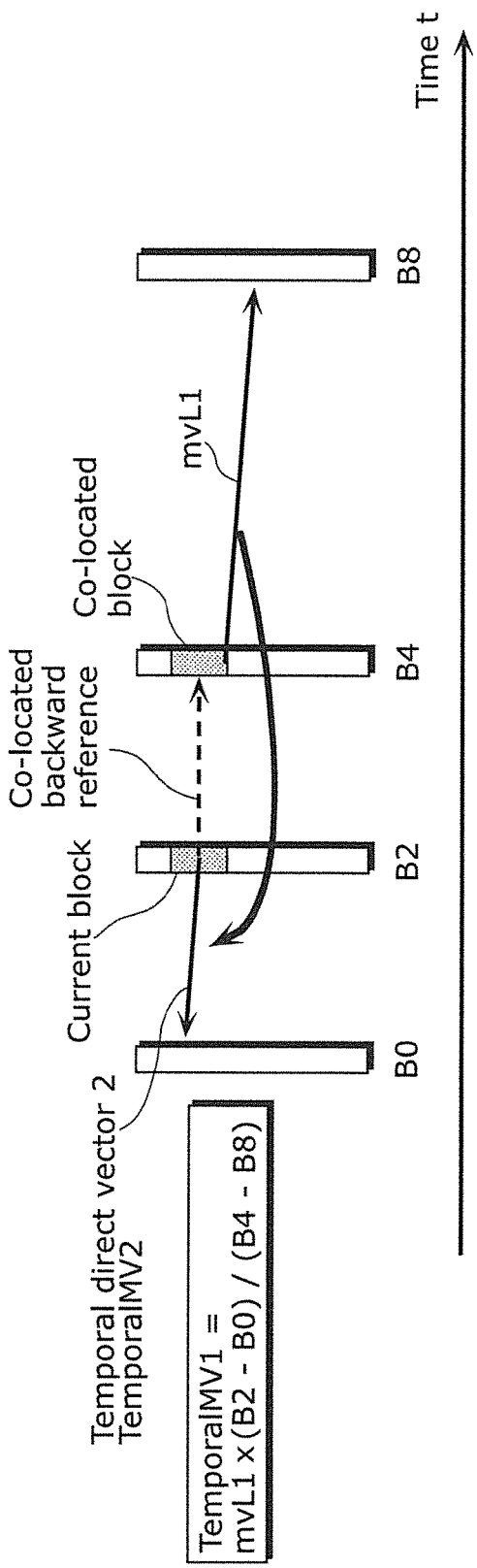

FIG. 21

| |
|---|
| Video stream (PID=0x1011 Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00 Secondary video) |
| Video stream (PID=0x1B01 Secondary video) |

FIG. 24
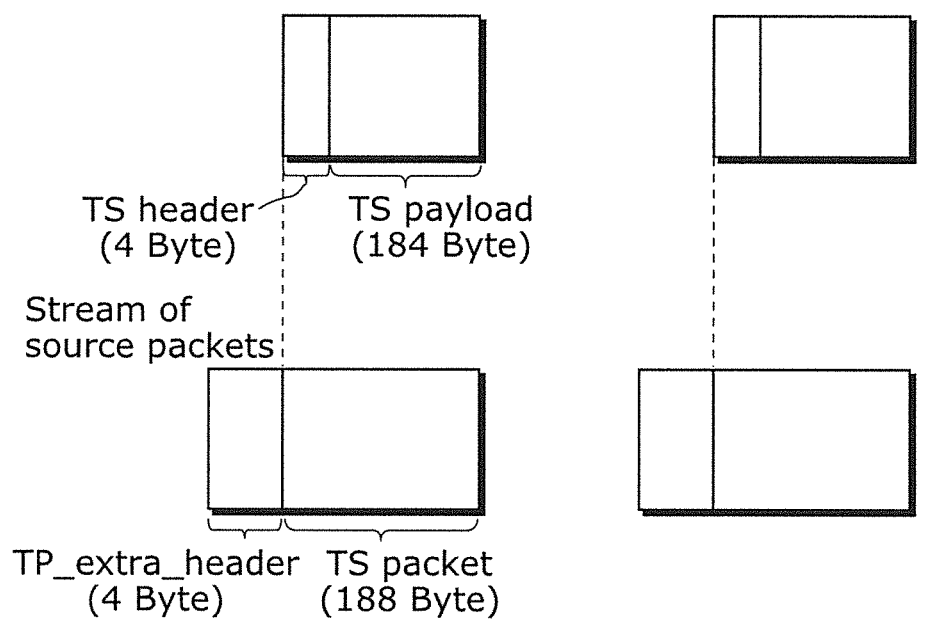
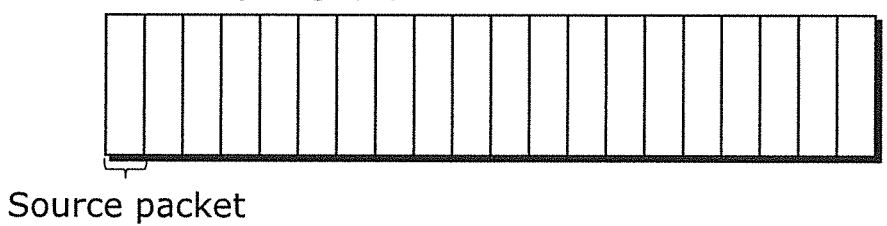

Data structure of PMT

FIG. 32

| Corresponding standard | Driving frequency |
|---|---|
| MPEG4. AVC | 500 MHz |
| MPEG2 | 350 MHz |
| ⋮ | ⋮ |

MOVING PICTURE CODING METHOD AND MOVING PICTURE DECODING METHOD USING A DETERMINATION WHETHER OR NOT A REFERENCE BLOCK HAS TWO REFERENCE MOTION VECTORS THAT REFER FORWARD IN DISPLAY ORDER WITH RESPECT TO A CURRENT PICTURE

BACKGROUND OF THE INVENTION

(1) Field of the Invention

The present invention relates to a moving picture coding method and a moving picture decoding method.

(2) Description of the Related Art

In moving picture coding processing, a quantity of information is generally reduced using redundancy of moving pictures in spatial and temporal directions. Here, a general method using the redundancy in the spatial direction is represented by the transformation into frequency domain while a general method using the redundancy in the temporal direction is represented by an inter-picture prediction (hereinafter referred to as inter prediction) coding process. In the inter prediction coding process, when coding a certain picture, a coded picture located before or after the current picture to be coded in display time order is used as a reference picture. Subsequently, a motion vector of the current picture with respect to the reference picture is derived by motion estimation, and a difference between image data of the current picture and prediction picture data resulting from motion compensation based on the motion vector is calculated to remove the redundancy in the temporal direction. Here, in the motion estimation, a difference value between a current block to be coded in the current picture and a block in the reference picture is calculated, and a block having the smallest difference value in the reference picture is determined as a reference block. The motion vector is then estimated using the current block and the reference block.

In the moving picture coding scheme (see Non Patent Reference: ITU-T H.264 March 2010) called H. 264, which has already been standardized, three types of picture, I-picture, P-picture, and B-picture, are used to compress the information amount. The I-picture is a picture on which no inter prediction coding is performed, that is, on which a coding process using intra-picture prediction (hereinafter referred to as intra prediction) is performed. The P-picture is a picture on which the inter prediction coding is performed with reference to one coded picture located before or after the current picture in display time order. The B-picture is a picture on which the inter prediction coding is performed with reference to two coded pictures located before or after the current picture in display time order.

In the inter prediction coding, a reference picture list for identifying a reference picture is generated. The reference picture list is a list in which reference picture indexes are allocated to coded reference pictures to be referred to in the inter prediction. For example, two reference lists correspond to the B-picture which is used for coding with reference to two pictures. A reference picture is identified from the reference picture list, using a reference picture index of the reference picture.

FIG. 1A illustrates allocation of reference picture indexes to reference pictures. Each of FIGS. 1B and 1C indicates an example of a reference picture list corresponding to the B-picture.

In FIG. 1A, a case is assumed where, for instance, a reference picture 3, a reference picture 2, a reference picture 1, and a current picture to be coded are arranged in display order. In this case, a reference picture list 1 (hereafter referred to as a reference list L0) is an example of a reference picture list in a prediction direction 1 for bidirectional prediction. As shown in FIG. 1B, a value "0" of a reference picture index 1 is allocated to the reference picture 1 in a display order 2, a value "1" of the reference picture index 1 is allocated to the reference picture 2 in a display order 1, and a value "2" of the reference picture index 1 is allocated to the reference picture 3 in a display order 0. In other words, the reference picture indexes are allocated in order of proximity to the current picture in display order. On the other hand, a reference picture list 2 (hereafter referred to as a reference list L1) is an example of a reference picture list in a prediction direction 1 for bidirectional prediction. As shown in FIG. 1C, a value "0" of a reference picture index 2 is allocated to the reference picture 1 in a display order 1, a value "1" of the reference picture index 2 is allocated to the reference picture 2 in a display order 2, and a value "2" of the reference picture index 1 is allocated to the reference picture 3 in a display order 0. As such, a different reference picture index can be allocated to each of the reference pictures, according to the prediction direction (the reference pictures 1 and 2 in FIG. 1A), and the same reference picture index can be allocated to the reference picture (the reference picture 3 in FIG. 1A). In coding the B-picture, the inter prediction is performed using a motion vector (mvL0) that refers to a reference picture identified by the reference picture index 1 in the reference list L0 and a motion vector (mvL1) that refers to a reference picture identified by the reference picture index 2 in the reference list L1. In the case of the P-picture, one reference list is used.

Furthermore, in the moving picture coding scheme called H. 264, a coding mode which is referred to as temporal direct can be selected to derive a motion vector in coding the B-picture. The inter prediction coding process in temporal direct is described with reference to FIG. 2. FIG. 2 is a schematic diagram showing a motion vector in temporal direct, and illustrates a case where a block "a" of a picture B2 is coded in the temporal direct. In this case, a motion vector "a" is used which has been used to code a block "b", co-located with the block "a", in a picture P3 serving as a reference picture located after the picture B2. The motion vector "a" is a motion vector which has been used to code the block "b" and refers to a picture P1. The block "a" is coded using bidirectional prediction with reference to reference blocks which are obtained, using motion vectors parallel to the motion vector "a", from the picture P1 serving as a forward reference picture and the picture P3 serving as a backward reference picture. This means that the motion vector to be used in coding the block "a" is the motion vector "b" for the picture P1 and a motion vector "c" for the picture P3.

SUMMARY OF THE INVENTION

However, in the conventional temporal direct, the motion vector to be used in the temporal direct is a motion vector of a reference picture located after the current picture in display time order and limited to a motion vector directed forward in display time order.

Such a limitation of the motion vector to be used in the temporal direct causes problems of making it difficult to derive the motion vector most suitable for the current picture, which leads to a decreased compression rate.

The present invention has an object to solve the above problems, and the object is to provide a moving picture coding method and a moving picture decoding method which make it possible to adaptively select the motion vector to be used in the temporal direct, so as to derive the motion vector most suitable for the current picture as well as to increase a compression rate.

In order to solve the problems, a moving picture coding method according to an aspect of the present invention is a moving picture coding method of coding a current block to be coded which is included in a current picture to be coded, the moving picture method including: determining (i) whether or not a reference block has two reference motion vectors that refer forward in display order or (ii) whether or not the reference block has two reference motion vectors that refer backward in display order, the reference block being included in a reference picture different from the current picture and being co-located, in the reference picture, with the current block in the current picture; calculating, when it is determined in the determining that the reference block has the two reference motion vectors, candidate motion vectors of the current block by scaling the respective two reference motion vectors; selecting, from among the candidate motion vectors, a candidate motion vector having a small error relative to a predetermined motion vector; and coding the current block using the predetermined motion vector, and coding an error between the predetermined motion vector and the selected candidate motion vector, and information for identifying the selected candidate motion vector.

Moreover, in the determining, when an order of assigning an index to a picture which can be referred to by the reference picture is same for a first reference picture list and a second reference picture list that correspond to the reference picture, it may be determined whether the reference block has the two reference motion vectors that refer forward in display order or the two reference motion vectors that refer backward in display order.

Moreover, in the calculating: when it is determined in the determining that the reference block does not have the two reference motion vectors and when the reference picture is located before the current picture in display order, a candidate motion vector of the current block may be calculated by scaling, among reference motion vectors of the reference block, a reference motion vector that refers backward in display order; and when it is determined in the determining that the reference block does not have the two reference motion vectors and when the reference picture is located after the current picture in display order, a candidate motion vector of the current block may be calculated by scaling, among the reference motion vectors of the reference block, a reference motion vector that refers forward in display order.

Moreover, the predetermined motion vector may be a motion vector calculated by motion estimation.

Moreover, the information for identifying the candidate motion vector may be an index, and in the coding, when the index is coded, a bitstream having a longer code length may be assigned as a value of the index increases.

Moreover, in the calculating: when the reference block is located before the current block in display order and does not have a reference motion vector, a candidate motion vector may be calculated using, among reference motion vectors of the reference block located after the current block in display order, a reference motion vector that refers forward in display order; and when the reference block is located after the current block in display order and does not have the reference motion vector, the candidate motion vector may be calculated using, among reference motion vectors of the reference block located before the current block in display order, a reference motion vector that refers backward in display order.

Moreover, in the calculating: when the reference block does not have the reference motion vector in the case where the reference block is located before the current block in display order, and when the reference block located after the current block in display order does not have the reference motion vector that refers forward in display order, the candidate motion vector may be calculated using a reference motion vector of the reference block located after the current block in display order and refers backward in display order; and when the reference block does not have the reference motion vector in the case where the reference block is located after the current block in display order, and when the reference block located before the current block in display order does not have the reference motion vector that refers backward in display order, the candidate motion vector may be calculated using a reference motion vector of the reference block located before the current block in display order and refers forward in display order.

Moreover, in the calculating, in addition to a first candidate motion vector and a second candidate motion vector, a motion vector of a block adjacent to left of the current block may be a third candidate motion vector, a motion vector of a block adjacent to top of the current block may be a fourth candidate motion vector, and a motion vector of a block adjacent to upper right of the current block may be a fifth candidate motion vector, and a candidate motion vector having a minimum error relative to the predetermined motion vector may be selected from among the first to fifth candidate motion vectors.

Furthermore, a moving picture decoding method according to another aspect of the present invention is a moving picture decoding method of decoding a current block to be decoded which is included in a current picture to be decoded, the moving picture decoding method including: determining (i) whether or not a reference block has two reference motion vectors that refer forward in display order or (ii) whether or not the reference block has two reference motion vectors that refer backward in display order, the reference block being included in a reference picture different from the current picture and being co-located, in the reference picture, with the current block in the current picture; calculating, when it is determined in the determining that the reference block has the two reference motion vectors, candidate motion vectors of the current block by scaling the respective two reference motion vectors; generating a candidate motion vector list in which the candidate motion vector corresponds to a value of a candidate motion vector index in one-to-one relationship; decoding index information for identifying a candidate motion vector to be used in decoding; decoding error information about an error between a predetermined motion vector and the candidate motion vector; calculating a motion vector by adding the error information and, among the candidate motion vectors on the candidate motion vector list, a candidate motion vector identified by the candidate motion vector index of a same value as a value indicated by the index information; and decoding the current block using the motion vector.

Moreover, in the determining, when an order of assigning an index to a picture which can be referred to by the reference picture is same for a first reference picture list and a second reference picture list that correspond to the reference picture, it may be determined whether the reference block has the two reference motion vectors that refer forward in display order or the two reference motion vectors that refer backward in display order.

Moreover, in said calculating: when it is determined in said determining that the reference block does not have the two reference motion vectors and when the reference picture is located before the current picture in display order, a candidate motion vector of the current block may be calculated by scaling, among reference motion vectors of the reference block, a reference motion vector that refers backward in display order; and when it is determined in said determining that the reference block does not have the two reference motion vectors and when the reference picture is located after the current picture in display order, the candidate motion vector of the current block may be calculated by scaling, among the reference motion vectors of the reference block, a reference motion vector that refers forward in display order.

Moreover, in the calculating: when the reference block is located before the current block in display order and does not have a reference motion vector, a candidate motion vector may be calculated using, among reference motion vectors of the reference block located after the current block in display order, a reference motion vector that refers forward in display order; and when the reference block is located after the current block in display order and does not have the reference motion vector, the candidate motion vector may be calculated using, among reference motion vectors of the reference block located before the current block in display order, a reference motion vector that refers backward in display order.

Moreover, in the calculating: when the reference block does not have the reference motion vector in the case where the reference block is located before the current block in display order, and when the reference block located after the current block in display order does not have the reference motion vector that refers forward in display order, the candidate motion vector may be calculated using a reference motion vector of the reference block located after the current block in display order and refers backward in display order; and when the reference block does not have the reference motion vector in the case where the reference block is located after the current block in display order, and when the reference block located before the current block in display order does not have the reference motion vector that refers backward in display order, the candidate motion vector may be calculated using a reference motion vector of the reference block located before the current block in display order and refers forward in display order.

It is to be noted that the present invention can be realized not only as the moving picture coding method and the moving picture decoding method but also as a moving picture coding apparatus and a moving picture decoding apparatus having, as units, the characteristics steps included in the moving picture coding method and the moving picture decoding method. The present invention can be also realized as a problem causing a computer to execute the steps. Such a program can be realized as a computer-readable recording medium such as a CD-ROM or as information, data, or a signal indicating the program. The program, the information, the data, or the signal may be distributed via a communication network such as the Internet.

According to an implementation of the present invention, adaptively selecting the motion vector to be used in the temporal direct makes it possible to derive the motion vector most suitable for the current picture as well as to increase the compression rate.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 6 is a table showing an example of a table used in performing variable-length coding on a predicted motion vector index;

FIG. 9A is a diagram showing an example of a method of deriving a candidate predicted motion vector in temporal direct;

FIG. 9B is a diagram showing another example of the method of deriving a candidate predicted motion vector in temporal direct;

FIG. 10A is a diagram showing another example of the method of deriving a candidate predicted motion vector in temporal direct;

FIG. 10B is a diagram showing another example of the method of deriving a candidate predicted motion vector in temporal direct;

FIG. 21 is a diagram showing a structure of multiplexed data;

FIG. 24 is a diagram showing structures of TS packets and source packets in multiplexed data;

FIG. 32 shows an example of a look-up table in which standards of video data are associated with driving frequencies;

DESCRIPTION OF THE PREFERRED EMBODIMENTS

Embodiments of the present invention are described below with reference to the drawings.

Embodiment 1

Figure 1:
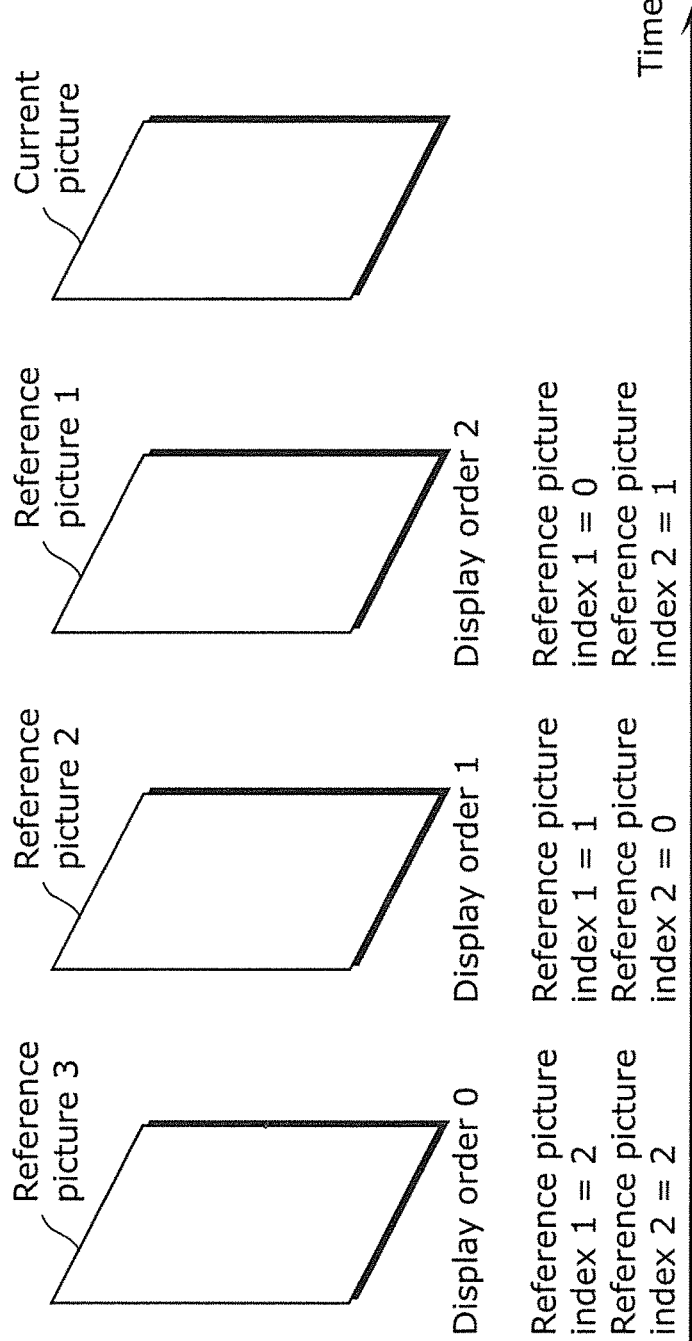
FIG. 1A is a diagram for illustrating allocation of reference picture indexes to reference pictures.
FIG. 1B is a table showing an example of a reference picture list corresponding to a B-picture.
FIG. 1C is a table showing an example of a reference picture list corresponding to the B-picture.
Figure 2:
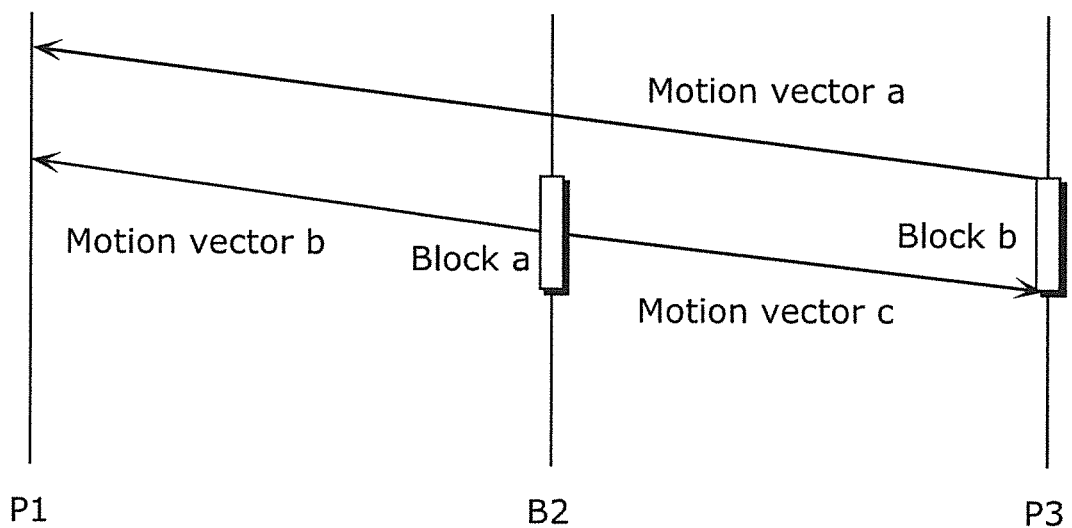
FIG. 2 is a schematic diagram showing a motion vector in temporal direct.
Figure 3:
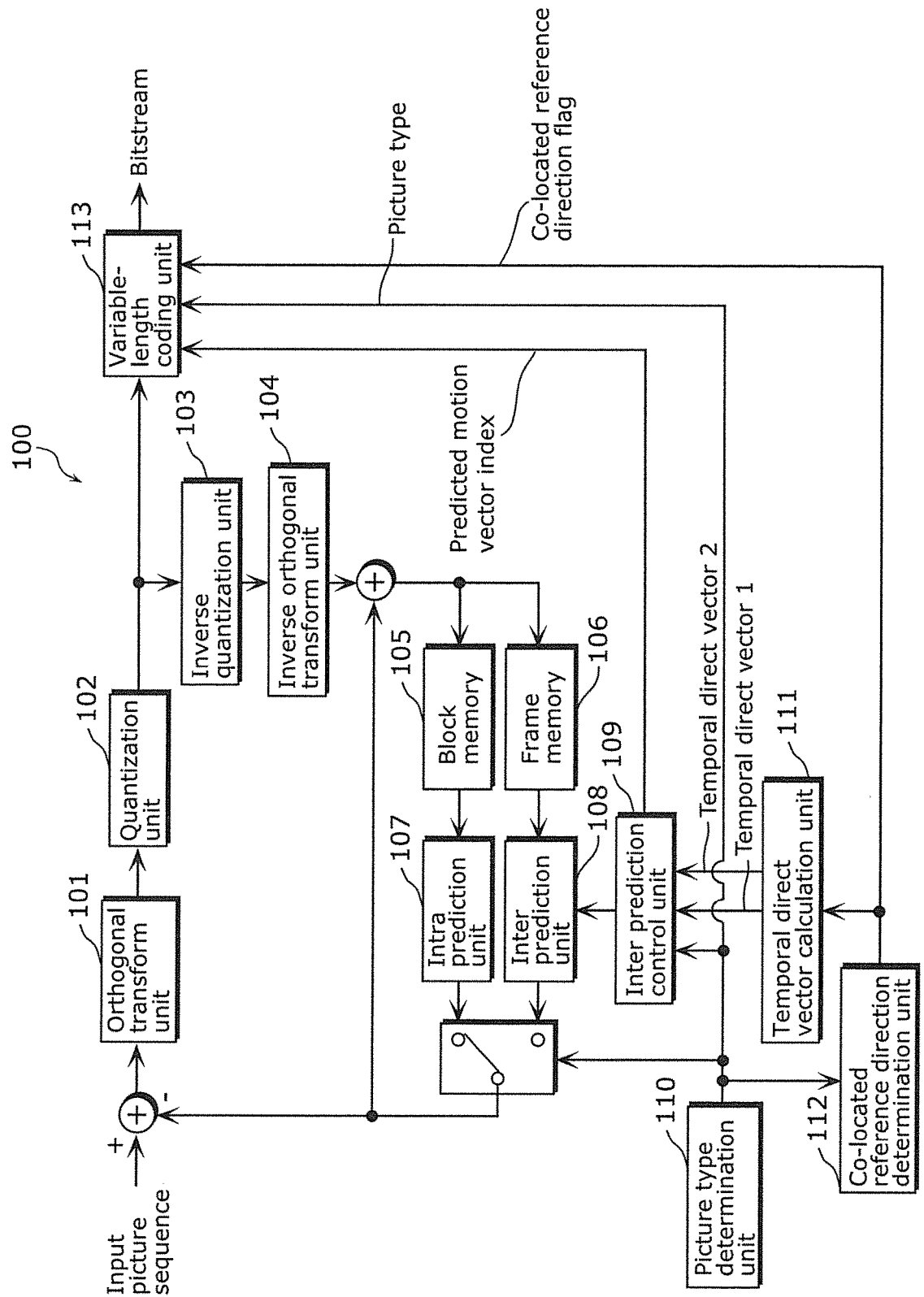
FIG. 3 is a block diagram showing a configuration of one embodiment of a moving picture coding apparatus using a moving picture coding method according to an implementation of the present invention.

FIG. 3 is a block diagram showing a configuration of one embodiment of a moving picture coding apparatus using a moving picture coding method according to an implementation of the present invention.

As shown in FIG. 3, a moving picture coding apparatus 100 includes an orthogonal transform unit 101, a quantization unit 102, an inverse quantization unit 103, an inverse orthogonal transform unit 104, a block memory 105, a frame memory 106, an intra prediction unit 107, an inter prediction unit 108, an inter prediction control unit 109, a picture type determination unit 110, a temporal direct vector calculation unit 111, a co-located reference direction determination unit 112, and a variable-length coding unit 113.

The orthogonal transform unit 101 transforms an input picture sequence from image domain into frequency domain. The quantization unit 102 performs a quantization process on the input picture sequence transformed into the frequency domain. The inverse quantization unit 103 performs an inverse quantization process on the input picture sequence on which the quantization unit 102 has performed the quantization process. The inverse orthogonal transform unit 104 transforms, from frequency domain into image domain, the input picture sequence on which the inverse quantization process has been performed. The block memory 105 stores the input picture sequence in units of blocks, and the frame memory 106 stores the input picture sequence in units of frames. The picture type determination unit 110 determines which one of the picture types, I-picture, B-picture, and P-picture, is used to code the input picture sequence, and generates picture type information. The intra prediction unit 107 codes, by intra prediction, the current block using the input picture sequence stored in units of blocks in the block memory 105, to generate prediction picture data. The inter prediction unit 108 codes, by inter prediction, the current block using the input picture sequence stored in units of frames in the frame memory 106 and a motion vector derived by motion estimation, to generate prediction picture data. The co-located reference direction determination unit 112 determines which one of a block included in a picture located before the current picture in display time order (hereinafter referred to as a forward reference block) and a block included in a picture located after the current picture in display time order (hereinafter referred to as a backward reference block) will be a co-located block. Moreover, the co-located reference direction determination unit 112 generates a co-located reference direction flag for each picture to add the co-located reference direction flag to the current picture, depending on which one of the forward reference block and the backward reference block is determined to be the co-located block. Here, the co-located block indicates a block which is included in a picture different from a picture including the current block and whose position in the picture is the same as that of the current block.

The temporal direct vector calculation unit 111 derives a candidate predicted motion vector in temporal direct using a reference motion vector of the co-located block. When the co-located block has two forward reference motion vectors or two backward reference motion vectors, the temporal direct vector calculation unit 111 derives candidate predicted motion vectors (a temporal direct vector 1 and a temporal direct vector 2) in the temporal direct using the two motion vectors of the co-located block. Moreover, the temporal direct vector calculation unit 111 assigns corresponding values of predicted motion vector indexes to the temporal direct vector 1 and the temporal direct vector 2, respectively. When the co-located block does not have the two forward reference motion vectors or the two backward reference motion vectors, the temporal direct vector calculation unit 111 determines a motion vector of the co-located block which is to be used in the temporal direct, depending on whether the co-located block is the forward reference block or the backward reference block. In other words, when the co-located block is the backward reference block, the temporal direct vector calculation unit 111 derives a candidate predicted motion vector (the temporal direct vector 1) in the temporal direct using a forward reference motion vector of the co-located block. Here, when the co-located block does not have the forward reference motion vector, the temporal direct vector calculation unit 111 derives the candidate predicted motion vector (the temporal direct vector 1) in the temporal direct using a backward reference motion vector of the co-located block. On the other hand, when the co-located block is the forward reference block, the temporal direct vector calculation unit 111 derives the candidate predicted motion vector (the temporal direct vector 1) is derived in the temporal direct using the backward reference motion vector of the co-located block. Here, when the co-located block does not have the backward reference motion vector, the temporal direct vector calculation unit 111 derives the candidate predicted motion vector (the temporal direct vector 1) in the temporal direct using the forward reference motion vector of the co-located block.

The inter prediction control unit 109 determines to code a motion vector using, among candidate predicted motion vectors, a candidate predicted motion vector having the least error with the motion vector derived by the motion estimation. Here, an error indicates a difference value between each of the candidate predicted motion vectors and the motion vector derived by the motion estimation. Moreover, the inter prediction control unit 109 generates, for each block, a predicted motion vector index corresponding to the predicted motion vector for which the determination is made. Furthermore, the inter prediction control unit 109 transmits, to the variable-length coding unit 113, the predicted motion vector index and error information of the candidate predicted motion vector.

The orthogonal transform unit 101 transforms, from image domain into frequency domain, prediction error data between generated prediction picture data and the input picture sequence. The quantization unit 102 performs a quantization process on the prediction error data transformed into the frequency domain. The variable-length coding unit 113 generates a bit stream by performing a variable-length coding process on the prediction error data on which the quantization process has been performed, the predicted motion vector index, prediction error information of the candidate predicted motion vector, the picture type information, and the co-located reference direction flag.

Figure 4:
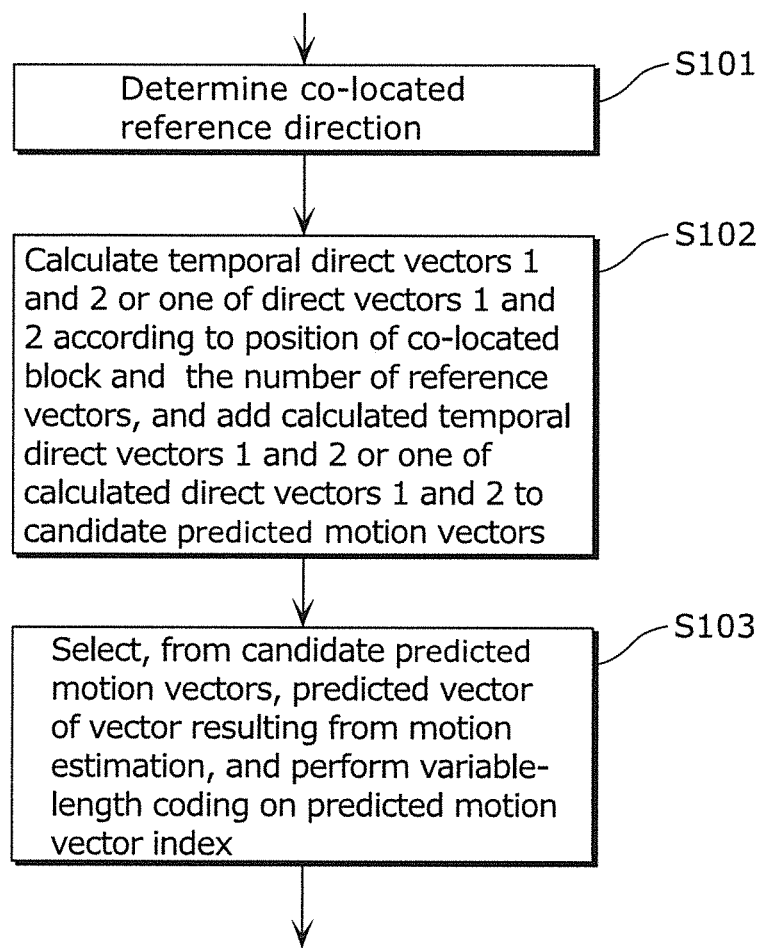
FIG. 4 shows an outline of a process flow of the moving picture coding method according to an implementation of the present invention.

FIG. 4 shows an outline of a process flow of the moving picture coding method according to an implementation of the present invention. In step S101, the co-located reference direction determination unit 112 determines which one of the forward reference block and the backward reference block will be the co-located block when deriving a candidate predicted motion vector in temporal direct. In addition, the co-located reference direction determination unit 112 generates, for each picture, a co-located reference direction flag indicating whether the co-located block is the forward reference block or the backward reference block.

In step S102, the temporal direct vector calculation unit 111 derives a candidate predicted motion vector in temporal direct using a reference motion vector of the co-located block. To put it differently, when the co-located block has two forward reference motion vectors or two backward reference motion vectors, the temporal direct vector calculation unit 111 derives candidate predicted motion vectors (a temporal direct vector 1 and a temporal direct vector 2) in the temporal direct using the two motion vectors of the co-located block. Moreover, the temporal direct vector calculation unit 111 assigns corresponding values of predicted motion vector indexes to the temporal direct vector 1 and the temporal direct vector 2, respectively. Here, generally speaking, when the predicted motion vector index indicates a small value, a required information amount decreases. In contrast, when the value increases, the required information amount increases. Thus, decreasing the value of the predicted motion vector index increases coding efficiency, the predicted motion vector index corresponding to a motion vector that is likely to be a motion vector with high accuracy. In response, a value of an index corresponding to the temporal direct vector 1 derived using a reference motion vector 1 (mvL0) of the co-located block is set smaller than a value of an index corresponding to the temporal direct vector 2 derived using a reference motion vector 2 (mvL1) of the co-located block. This is because when the co-located block has the two forward reference motion vectors or the two backward reference motion vectors, it is likely that motion estimation is performed on the reference motion vector 1 in preference to the reference motion vector 2, and the temporal direct vector derived using the reference motion vector 1 is likely to have higher accuracy. Moreover, the value of the index may be assigned based on a distance from a picture including the co-located block to a reference picture referred to by the co-located block. For instance, the distance is determined according to the number of pictures included between the picture including the co-located block and the reference picture referred to by the co-located block. When a distance corresponding to the reference motion vector 1 is shorter than a distance corresponding to the reference motion vector 2, the value of the index corresponding to the temporal direct vector 1 is set smaller than the value of the index corresponding to the temporal direct vector 2. The value of the index may be determined based on a magnitude of an absolute value of the reference motion vector.

On the other hand, when the co-located block does not have the two forward reference motion vectors or the two backward reference motion vectors, the temporal direct vector calculation unit 111 determines the motion vector of the co-located block which is to be used in the temporal direct, depending on whether the co-located block is the forward reference block or the backward reference block. In other words, when the co-located block is the backward reference block, the temporal direct vector calculation unit 111 derives a candidate predicted motion vector (the temporal direct vector 1) in the temporal direct using a forward reference motion vector of the co-located block. Here, when the co-located block does not have the forward reference motion vector, the temporal direct vector calculation unit 111 derives the candidate predicted motion vector (the temporal direct vector 1) in the temporal direct using a backward reference motion vector of the co-located block. In contrast, when the co-located block is the forward reference block, the temporal direct vector calculation unit 111 derives the candidate predicted motion vector (the temporal direct vector 1) is derived in the temporal direct using the backward reference motion vector of the co-located block. Here, when the co-located block does not have the backward reference motion vector, the temporal direct vector calculation unit 111 derives the candidate predicted motion vector (the temporal direct vector 1) in the temporal direct using the forward reference motion vector of the co-located block.

In step S103, the inter prediction control unit 109 codes a picture by inter prediction using the motion vector derived by the motion estimation. Moreover, the inter prediction control unit 109 determines to code a motion vector using, among candidate predicted motion vectors, a candidate predicted motion vector having the least error. For example, it is determined that, assuming that a difference value between each of the candidate predicted motion vectors and the motion vector derived by the motion estimation is an error, the candidate predicted motion vector having the least error is used in coding the motion vector. Then, the variable-length coding unit 113 performs variable-length coding on a predicted motion vector index corresponding to a selected candidate predicted motion vector and error information of the selected predicted motion vector.

Figures 5A, 5B:
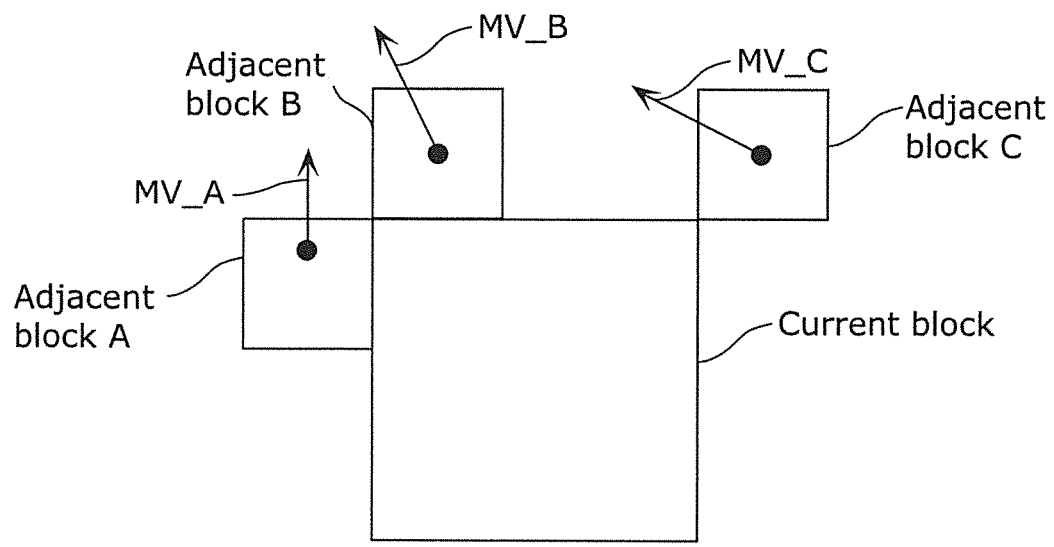
FIG. 5A is a diagram showing an example of a candidate predicted motion vector.
FIG. 5B is a table showing an example of a method of assigning a predicted motion vector index.

FIG. 5A is a diagram showing an example of a candidate predicted motion vector. A motion vector A (MV_A) is a motion vector of an adjacent block A located to the left of a current block. A motion vector B (MV_B) is a motion vector of an adjacent block B located to the top of the current block. A motion vector C (MV_C) is a motion vector of an adjacent block C located to the upper right of the current block. Median (MV_A, MV_B, MV_C) indicates a median value among the motion vectors A, B, and C. Here, the median value is calculated by the following (Equation 1) to (Equation 3).

[Math. 1]

$$\text{Median}(x, y, z) = x + y + z - \text{Min}(x, \text{Min}(y, z)) - \text{Max}(x, \text{Max}(y, z)) \quad \text{(Equation 1)}$$

$$\text{Min}(x, y) = \begin{cases} x & (x \leq y) \\ y & (x > y) \end{cases} \quad \text{(Equation 2)}$$

$$\text{Max}(x, y) = \begin{cases} x & (x \geq y) \\ y & (x < y) \end{cases} \quad \text{(Equation 3)}$$

FIG. 5B is a table showing an example of a method of assigning a predicted motion vector index. Among values of predicted motion vector indexes, a value corresponding to Median (MV_A, MV_B, MV_C) is 0, a value corresponding to the motion vector A is 1, a value corresponding to the motion vector B is 2, a value corresponding to the motion vector C is 3, a value corresponding to a temporal direct vector 1 is 4, and a value corresponding to a temporal direct vector 2 is 5. The assignment method for a predicted motion vector index is not limited to this example.

FIG. 6 is a table showing an example of a table used in performing variable-length coding on a predicted motion vector index. A code having a shorter code length is assigned to a value of a predicted motion vector index in ascending order of value. As a result, it is possible to increase coding efficiency by decreasing a value of a predicted motion vector index corresponding to a candidate predicted motion vector that is likely to have high prediction accuracy.

Figure 7:
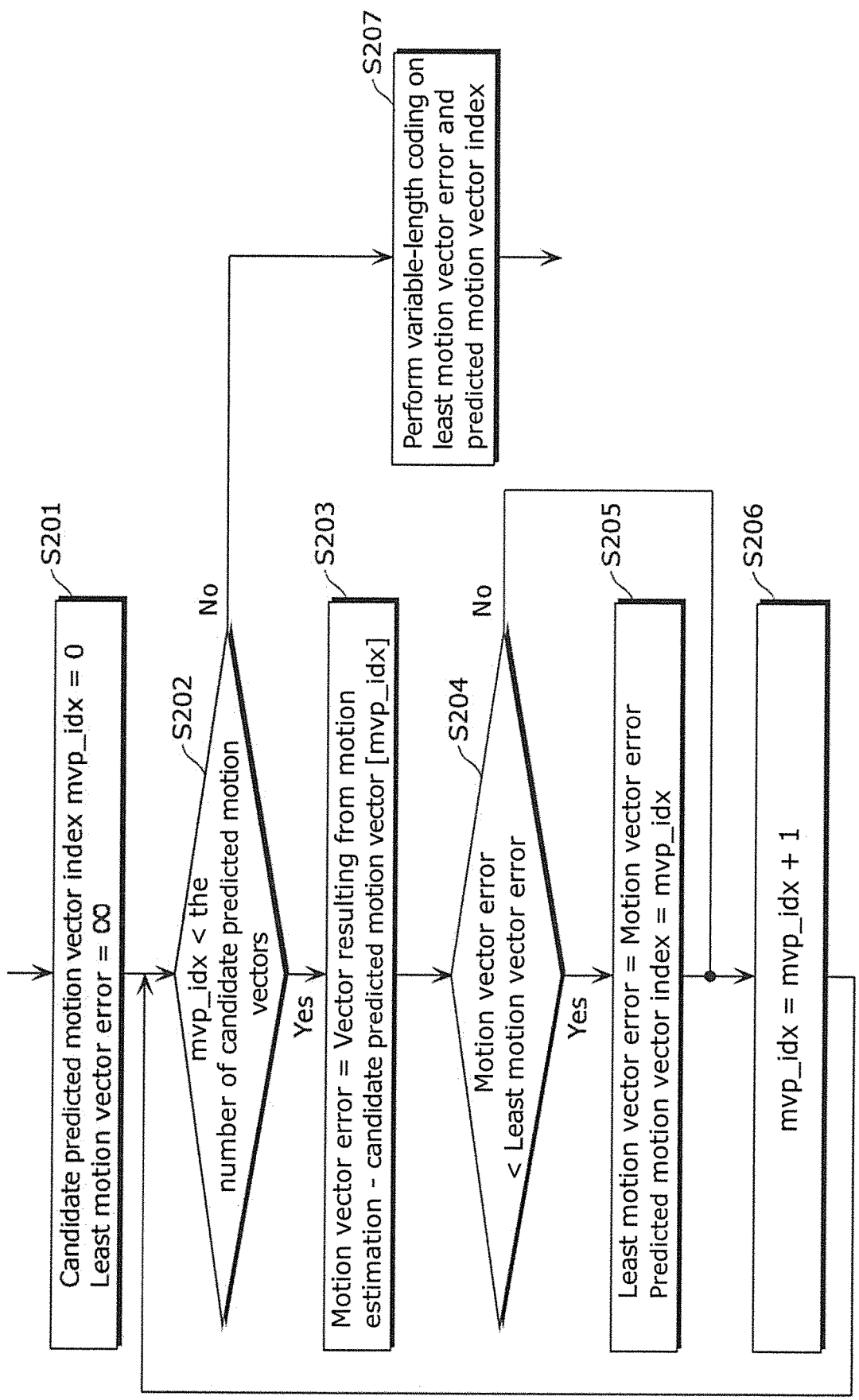
FIG. 7 is a flowchart showing a flow of determining a candidate predicted motion vector in an inter prediction control unit according to Embodiment 1.

FIG. 7 is a flowchart showing a flow of determining a candidate predicted motion vector in the inter prediction control unit 109. In step S201, it is assumed that a candidate predicted motion vector index mvp_idx indicates 0 and the least motion vector error is ∞. In step S202, it is determined whether or not a candidate predicted motion vector index mvp_idx is smaller than the number of candidate predicted motion vectors. In step S203, when it is determined in step S202 that the candidate predicted motion vector index mvp_idx is smaller than the number of the candidate predicted motion vectors, a motion vector error is calculated from a difference between the motion vector derived by the motion estimation and the candidate predicted motion vector. In step S204, it is determined whether or not the motion vector error calculated in step S202 is smaller than the least motion vector error. In step s205, when it is determined in step S204 that the motion vector error calculated in step S202 is smaller than the least motion vector error (Yes in step S204), it is assumed that the least motion vector error is the calculated motion vector error and the predicted motion vector index is the candidate predicted motion vector index mvp_idx. In step S206, the value "1" is added to the candidate predicted motion vector index mvp_idx, and the flow returns to step S202. In contrast, in step S207, when it is determined in step S202 that the candidate predicted motion vector index mvp_idx is not smaller than the number of the candidate predicted motion vectors (No in step S202), variable-length coding is performed on the least motion vector error and the predicted motion vector index. As described above, the candidate predicted motion vector having the least error with the motion vector derived by the motion estimation is determined to be used in coding the motion vector in the flow shown in FIG. 7. Then, variable-length coding is performed on error information of the candidate predicted motion vector for which the determination is made and a predicted motion vector index indicating a predicted motion vector.

Figure 8:
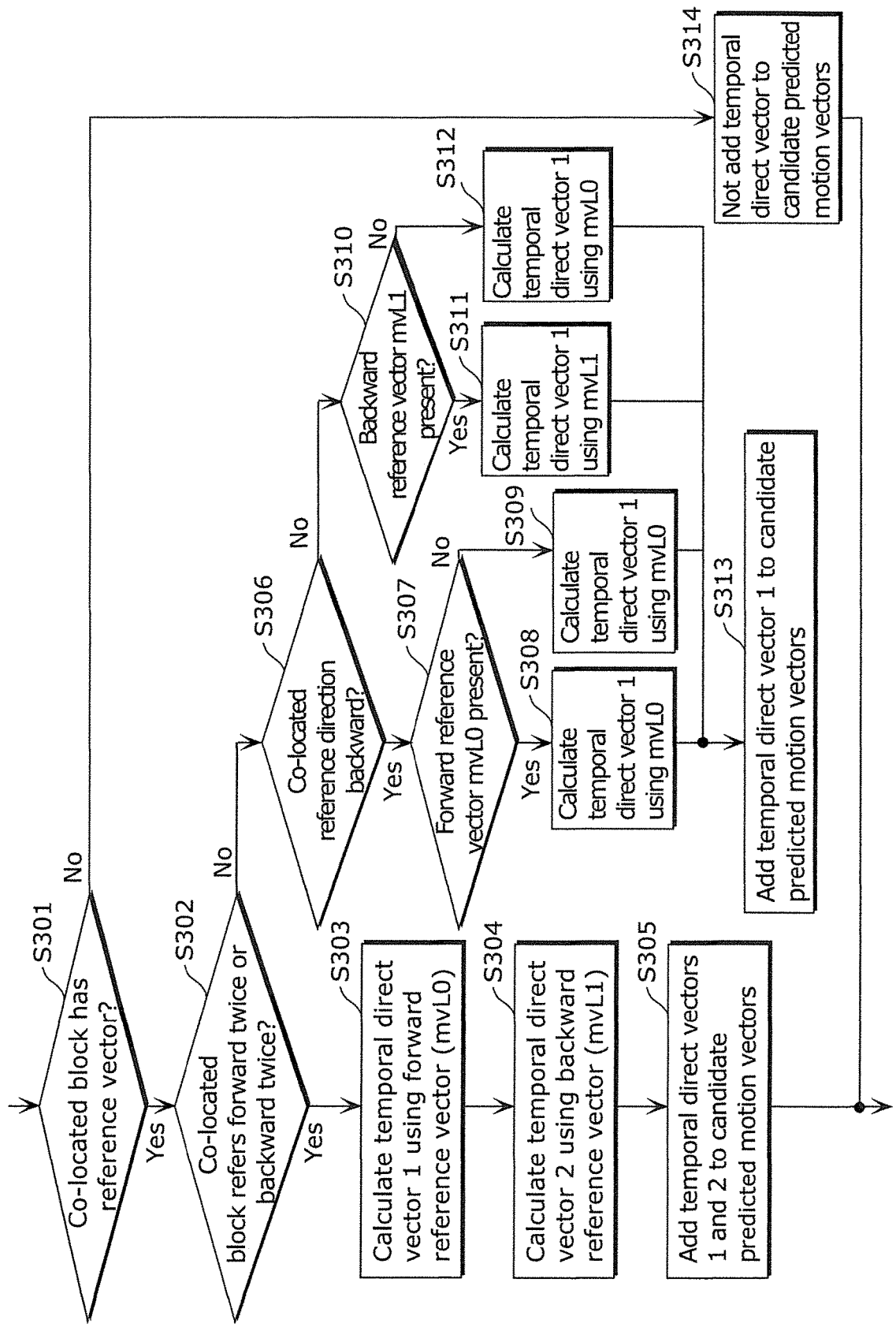
FIG. 8 is a flowchart showing a detailed process flow of step S102 shown in FIG. 4.

FIG. 8 is a flowchart showing a detailed process flow of step S102 shown in FIG. 4. The following describes FIG. 8. In step S301, the temporal direct vector calculation unit 111 determines whether or not the co-located block has a reference motion vector. In step S302, when it is determined in step S301 that the co-located block has the reference motion vector (Yes in step S301), the temporal direct vector calculation unit 111 determines (i) whether or not the co-located block has referred forward twice or (ii) whether or not the co-located block has referred backward twice. In step S303, when it is determined in step S302 that the co-located block has referred forward twice or backward twice (Yes in step S302), the temporal direct vector calculation unit 111 derives a candidate predicted motion vector (a temporal direct vector 1) in temporal direct using a motion vector (mvL0) of the co-located block. In step S304, the temporal direct vector calculation unit 111 derives a candidate predicted motion vector (a temporal direct vector 2) in the temporal direct using a motion vector (mvL1) of the co-located block. In step S305, the temporal direct vector calculation unit 111 adds the temporal direct vectors 1 and 2 to candidate predicted motion vectors.

In contrast, in step S306, when it is determined in step S302 that the co-located block has not referred forward twice or backward twice (No in step S302), the temporal direct vector calculation unit 111 determines whether or not the co-located block is a backward reference block. In step S307, when it is determined in step S306 that the co-located block is the backward reference block (Yes in step S306), the temporal direct vector calculation unit 111 determines whether or not the co-located block has the forward reference motion vector (mvL0). In step S308, when it is determined in step S307 that the co-located block has the forward reference motion vector (mvL0) (Yes in step S307), the temporal direct vector calculation unit 111 derives the temporal direct vector 1 in the temporal direct using the forward reference motion vector (mvL0). In contrast, in step S309, when it is determined in step S307 that the co-located block does not have the forward reference motion vector (mvL0) (No in step S307), the temporal direct vector calculation unit 111 derives the temporal direct vector 1 in the temporal direct using the backward reference motion vector (mvL1) of the co-located block. In step S310, when it is determined in step S306 that the co-located block is not the backward reference block, that is, that the co-located block is the forward reference block (No in step S306), the temporal direct vector calculation unit 111 determines whether or not the co-located block has the backward reference motion vector (mvL1). In step S311, when it is determined in step S310 that the co-located block has the backward reference motion vector (mvL1) (Yes in step S310), the temporal direct vector calculation unit 111 derives the candidate predicted motion vector (the temporal direct vector 1) in the temporal direct using the backward reference motion vector (mvL1). In contrast, in step S312, when it is determined in step S310 that the co-located block does not have the backward reference motion vector (mvL1) (No in step S310), the temporal direct vector calculation unit 111 derives the temporal direct vector 1 in the temporal direct using the forward reference motion vector (mvL0) of the co-located block. In step S313, the temporal direct vector calculation unit 111 adds the temporal direct vector 1 derived in step S308, step S309, step S311, or step S312, to the candidate predicted motion vectors.

In step S314, when it is determined in step S301 that the co-located block does not have the reference motion vector (mvL0 or mvL1), the temporal direct vector calculation unit 111 neither derives the candidate predicted motion vector in the temporal direct nor adds the candidate predicted motion vector to the candidate predicted motion vectors.

Next, a method of deriving a motion vector in temporal direct is described in detail.

FIG. 9A illustrates a method of deriving, when the co-located block has referred forward twice, that is, has the two forward reference motion vectors (mvL0 and mvL1), candidate predicted motion vectors (temporal direct vectors 1 and 2) in temporal direct using the respective motion vectors. The candidate predicted motion vectors (TemporalMV1 and TemporalMV2) are derived by the following equations.

$$\text{TemporalMV1}=mvL0 \times (B8-B4)/(B4-B2) \quad \text{(Equation 4)}$$

$$\text{TemporalMV2}=mvL1 \times (B8-B4)/(B4-B0) \quad \text{(Equation 5)}$$

Here, (B4–B0) indicates information about a time difference in display time between a picture B4 and a picture B0, and (B8–B4) indicates information about a time difference in display time between a picture B8 and the picture B4.

FIG. 9B illustrates a method of deriving, when the co-located block has referred backward twice, that is, has the two backward reference motion vectors (mvL0 and mvL1), candidate predicted motion vectors (temporal direct vectors 1 and 2) in temporal direct using the respective motion vectors. The candidate predicted motion vectors (TemporalMV1 and TemporalMV2) are derived by the following equations.

$$\text{TemporalMV1}=mvL0 \times (B2-B0)/(B4-B2) \quad \text{(Equation 6)}$$

$$\text{TemporalMV2}=mvL1 \times (B2-B0)/(B8-B2) \quad \text{(Equation 7)}$$

Here, (B4–B0) indicates information about a time difference in display time between a picture B4 and a picture B0, and (B8–B4 indicates information about a time difference in display time between a picture B8 and the picture B4.

FIG. 10A illustrates a method of deriving, when the co-located block is the backward reference block and has the forward reference motion vector and the backward reference motion vector, a candidate predicted motion vector (a temporal direct vector 1) in temporal direct using the forward reference motion vector. The candidate predicted motion vector (TemporalMV1) is derived using the forward reference motion vector by the following equation.

$$\text{TemporalMV1}=mvL0 \times (B2-B0)/(B4-B0) \quad \text{(Equation 8)}$$

Here, (B2–B0) indicates information about a time difference in display time between a picture B2 and a picture B0, and (B4–B0 indicates information about a time difference in display time between a picture B4 and the picture B0.

FIG. 10B illustrates a method of deriving, when the co-located block is the backward reference block and has only the backward reference motion vector, a candidate predicted motion vector (a temporal direct vector 1) in temporal direct using the backward reference motion vector. The candidate predicted motion vector is derived using the forward reference motion vector by the following equation.

$$\text{TemporalMV1}=mvL1 \times (B2-B0)/(B4-B8) \quad \text{(Equation 9)}$$

Figure 11A:
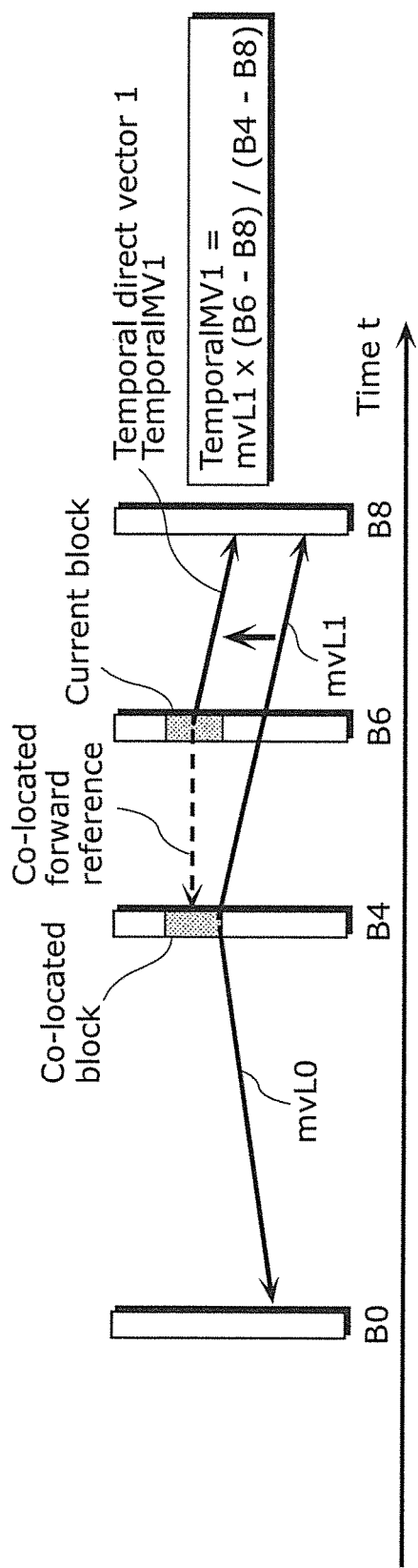
FIG. 11A is a diagram showing another example of the method of deriving a candidate predicted motion vector in temporal direct.

FIG. 11A illustrates a method of deriving, when the co-located block is the forward reference block and has the forward reference motion vector and the backward reference motion vector, a candidate predicted motion vector (a temporal direct vector 1) in temporal direct using the backward reference motion vector. The candidate predicted motion vector is derived using the forward reference motion vector by the following equation.

$$\text{TemporalMV1}=mvL1 \times (B6-B8)/(B4-B8) \quad \text{(Equation 10)}$$

Figure 11B:
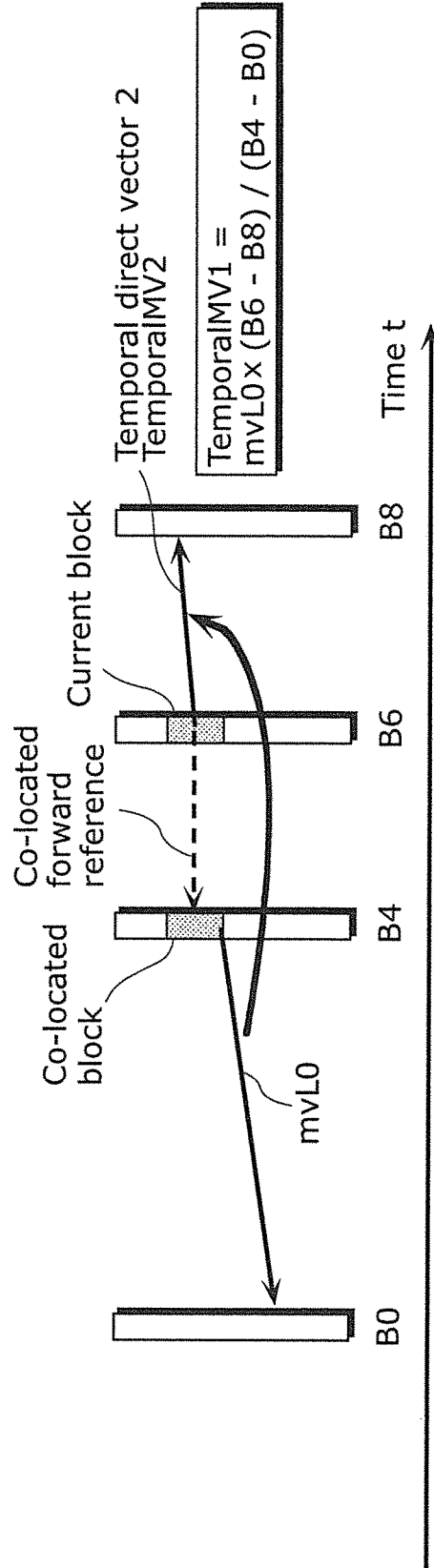
FIG. 11B is a diagram showing another example of the method of deriving a candidate predicted motion vector in temporal direct.

FIG. 11B illustrates a method of deriving, when the co-located block is the forward reference block and has only the forward reference motion vector, a candidate predicted motion vector (a temporal direct vector 1) in temporal direct using the forward reference motion vector. The candidate predicted motion vector is derived using the forward reference motion vector by the following equation.

$$\text{TemporalMV1}=mvL0 \times (B6-B8)/(B4-B0) \quad \text{(Equation 11)}$$

As described above, this embodiment makes it possible to increase the coding efficiency by using, among the candidate predicted motion vectors, the candidate predicted motion vector having the least error in coding the motion vector. For instance, an error is defined as a difference value between a motion vector obtained by motion estimation and each of candidate predicted motion vectors. Moreover, this embodiment makes it possible to narrow down to the candidate predicted motion vector with high accuracy by selecting the reference motion vector of the co-located block, which is to be used in temporal direct, depending on the position of the co-located block and the number of the reference motion vectors of the co-located block, and thus to reduce processing loads in coding and decoding. More specifically, when the co-located block has referred forward twice or backward twice, it is highly likely that accuracy of the candidate predicted motion vectors (the temporal direct vectors 1 and 2) derived in temporal direct using the two motion vectors of the co-located block is approximated. Consequently, in this case, both of the motion vectors are added to the candidate predicted motion vectors. On the other hand, when the co-located block has the forward reference motion vector and the backward reference motion vector, a motion vector to be used in temporal direct is selected depending on the position of the co-located block. When the co-located block is the backward reference block, the forward reference motion vector is used. This is because the forward reference motion vector is a motion vector in a direction from a picture including the co-located block to a picture including a current block and is highly likely to have a prediction error smaller than that of the backward reference motion vector. In contrast, when the co-located block is the forward reference block, the backward reference motion vector is used. This is because the backward reference motion vector is the motion vector in the direction from the picture including the co-located block to the picture including the current block and is highly likely to have the prediction error smaller than that of the forward reference motion vector.

It is to be noted that although it is determined (i) whether or not the co-located block has referred forward twice or (ii) whether the co-located block has referred backward twice in this embodiment, the position of the co-located block may be further determined simultaneously. More specifically, in step S302 shown in FIG. 8, when the co-located block is the forward reference block, it is determined whether the co-located block has referred forward twice, or when the co-located block is the backward reference block, it is determined whether the co-located block has referred backward twice. When the co-located block is the backward reference block, the backward reference motion vector is a motion vector in a direction from the picture including co-located block to a picture opposite to the picture including the current block. As a result, prediction accuracy of the backward reference motion vector is reduced. In such a case, the prediction accuracy is increased by deriving both of the temporal direct vectors 1 and 2. As stated above, it is possible to reduce a processing amount while increasing the prediction accuracy by calculating the temporal direct vectors 1 and 2 only when the prediction accuracy is reduced.

Moreover, although, in FIG. 8, the temporal direct vector is not calculated when the co-located block does not have the reference motion vector, assuming that another block is the co-located block, it is possible to calculate the temporal direct vector. For example, when the co-located block is the backward reference block and does not have the reference motion vector, it is conceivable that the forward reference block is the co-located block. In this case, it is possible to increase the prediction accuracy by using, among reference motion vectors of the forward reference block, a reference motion vector that is backward in display order. Moreover, when the forward reference block does not have the reference motion vector that is backward in display order, it is possible to derive the temporal direct vector by using a reference motion vector that is forward in display order. In contrast, when the co-located block is the forward reference block and does not have the reference motion vector, it is conceivable that the backward reference block is the co-located block. In this case, it is possible to increase the prediction accuracy by using, among reference motion vectors of the backward reference block, the reference motion vector that is forward in display order. Moreover, when the backward reference block does not have the reference motion vector that is forward in display order, it is possible to derive the temporal direct vector by using the reference motion vector that is backward in display order. It is to be noted that the co-located block is a block in a picture whose value of an index is "0" in a reference picture list L0 of a current picture. Consequently, when the co-located block identified by the value "0" of the index in the reference picture list L0 does not have a reference motion vector, it is conceivable to use a reference motion vector of a co-located block identified by the value "0" of an index in a reference picture list L1.

Embodiment 2

Embodiment 2 differs from Embodiment 1 in step S302 shown in FIG. 8. The following mainly describes differences from Embodiment 1.

Figure 12:
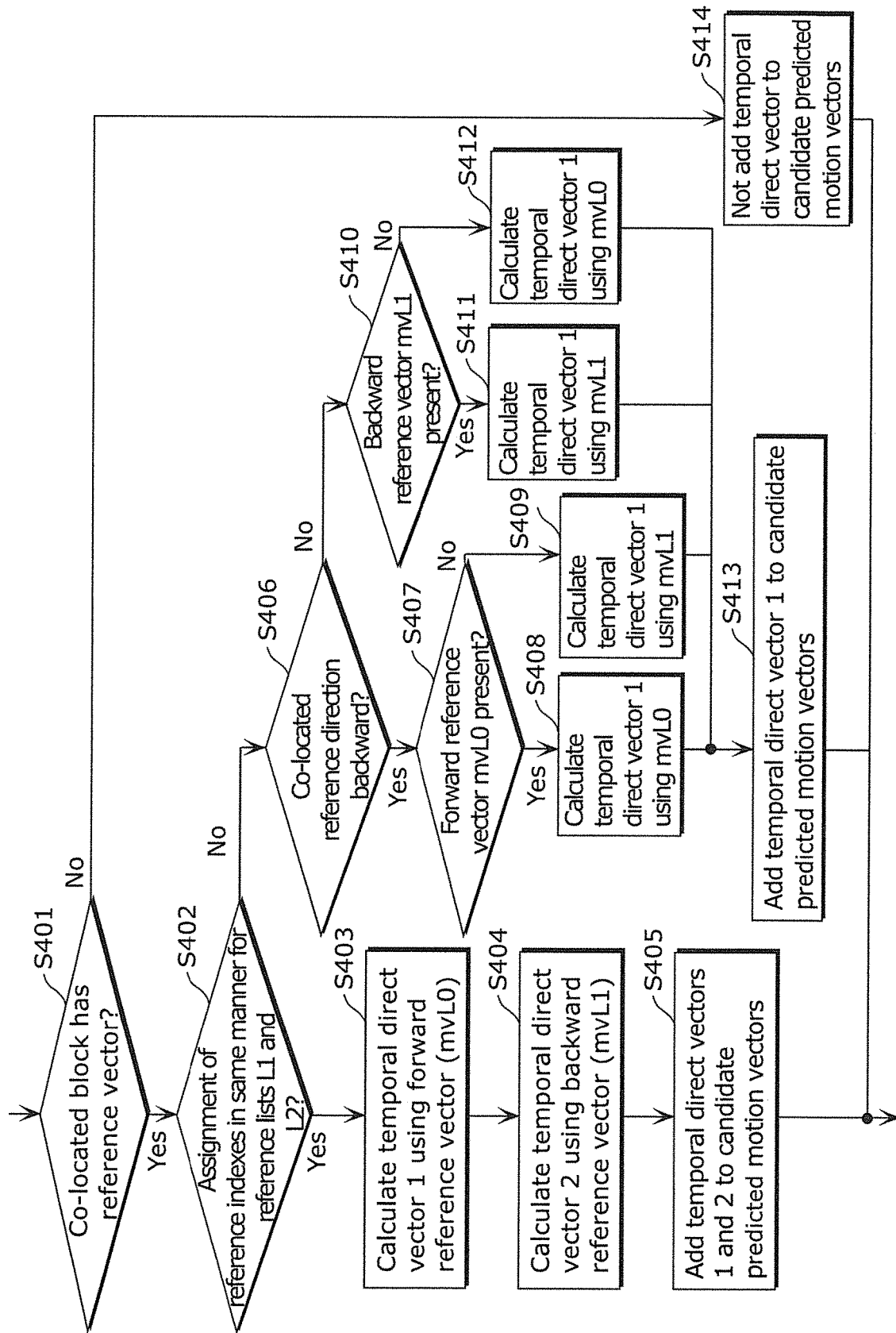
FIG. 12 is a flowchart showing a detailed process flow of step S102 shown in FIG. 4 in Embodiment 2.

FIG. 12 is a flowchart showing a detailed process flow of step S102 shown in FIG. 4. The following describes FIG. 12.

In S402 shown in FIG. 10, the temporal direct vector calculation unit 111 determines whether a method for assigning a reference picture index to a reference picture is the same for reference lists L1 and L2. Generally speaking, the reference picture index is assigned to a picture located after a current picture in display time order in the reference list L2. In contrast, the reference picture index is assigned to a picture located before the current picture in display time order in the reference list L1. Consequently, when the method for assigning a reference picture index to a reference picture is the same for the reference lists L1 and L2, a reference direction is limited to one of a forward direction and a backward direction in display order with respect to the current picture.

In steps S403 and S404, when it is determined in step S402 that the method for assigning a reference picture index to a reference picture is the same for the reference lists L1 and L2 (Yes in step S402), the temporal direct vector calculation unit 111 derives temporal direct vectors 1 and 2 derived in temporal direct using reference motion vectors mvL0 and mvL1 of a co-located block. The reference motion vectors mvL0 and mvL1 have the same reference direction, and thus prediction accuracy of the reference motion vectors is approximated. Consequently, it is possible to increase the prediction accuracy by adding both of the reference motion vectors to candidate predicted motion vectors. When the co-located block has only one of the reference motion vectors mvL0 and mvL1, the temporal direct vector 1 is derived in the temporal direct using the only one of the reference motion vectors mvL0 and mvL1. In other words, only one of steps S403 and S404 is performed. Processes subsequent to step S406 are the same as those in Embodiment 1, and thus a description thereof is omitted.

As described above, this embodiment makes it possible to reduce the processing amount in coding and decoding by making the determination based on the reference lists. The determination may be made per picture, because the reference picture indexes are assigned to the respective pictures in the reference lists. In addition, the determination does not need to be made per block. Thus, it is possible to reduce the processing amount.

Embodiment 3

Figure 13:
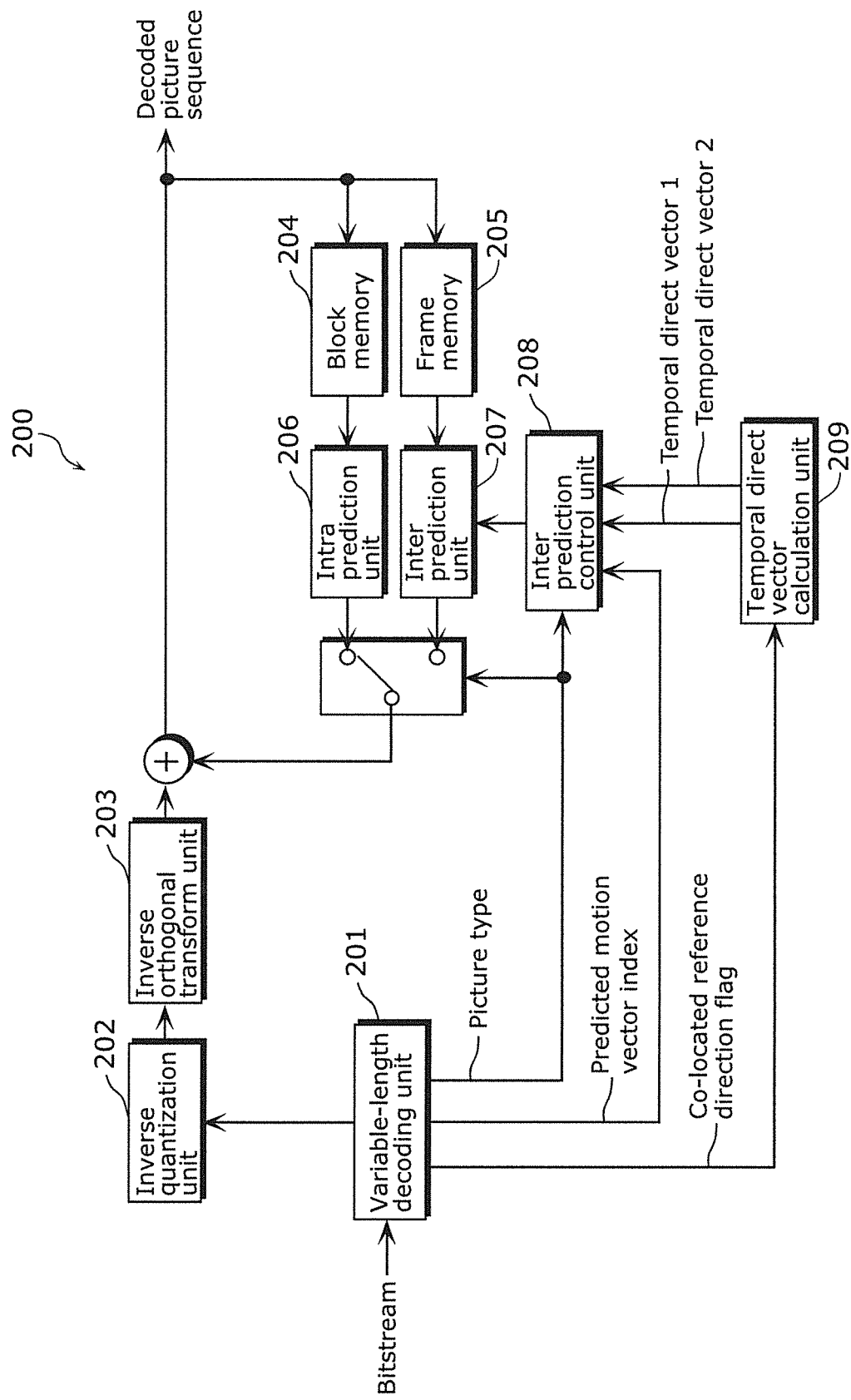
FIG. 13 is a block diagram showing a configuration of one embodiment of a moving picture decoding apparatus using a moving picture decoding method according to an implementation of the present invention.

FIG. 13 is a block diagram showing a configuration of one embodiment of a moving picture decoding apparatus using a moving picture decoding method according to an implementation of the present invention.

In Embodiment 3, a current block included in a picture located, in display time order, before a current picture to be decoded is referred to as a forward reference block. Moreover, a current block included in a picture located, in display time order, after the current picture is referred to as a backward reference block.

The moving picture decoding apparatus 200 includes, as shown in FIG. 13, a variable-length decoding unit 201, an inverse quantization unit 202, an inverse orthogonal transform unit 203, a block memory 204, a frame memory 205, an intra prediction unit 206, an inter prediction unit 207, an inter prediction control unit 208, and a temporal direct vector calculation unit 209.

The variable-length decoding unit 201 performs a variable-length decoding process on an input bit stream to generate picture type information, predicted motion vector indexes, co-located reference direction flags, and a bitstream on which the variable-length decoding process is performed. The inverse quantization unit 202 performs an inverse quantization process on the bitstream on which the variable-length decoding process is performed. The inverse orthogonal transform unit 203 transforms, from frequency domain into image domain, the bitstream on which the inverse quantization process is performed, to generate prediction error picture data. The block memory 204 stores, in units of blocks, a picture sequence generated by adding the prediction error picture data and prediction picture data, and the frame memory 205 stores the picture sequence in units of frames. The intra prediction unit 206 performs intra prediction using the picture sequence stored in units of blocks in the block memory 204, and thereby generates prediction error picture data for the current block. The inter prediction unit 207 performs inter prediction using the picture sequence stored in units of frames in the frame memory 205, and thereby generates prediction error picture data for the current block. The temporal direct vector calculation unit 209 derives a candidate predicted motion vector in temporal direct using a reference motion vector of the co-located block. When the co-located block has two forward reference motion vectors or two backward reference motion vectors, candidate predicted motion vectors (a temporal direct vector 1 and a temporal direct vector 2) are derived in the temporal direct using the two motion vectors of the co-located block. Moreover, the temporal direct vector calculation unit 209 assigns corresponding values of predicted motion vector indexes to the temporal direct vector 1 and the temporal direct vector 2, respectively. When the co-located block does not have the two forward reference motion vectors or the two backward reference motion vectors, the motion vector of the co-located block which is to be used in temporal direct is determined depending on whether the co-located block is the forward reference block or the backward reference block. When the co-located block is the backward reference block, the temporal direct vector calculation unit 209 derives the candidate predicted motion vector (the temporal direct vector 1) in the temporal direct using the forward reference motion vector of the co-located block. When the co-located block does not have the forward reference motion vector, the temporal direct vector calculation unit 209 derives the candidate predicted motion vector (the temporal direct vector 1) in the temporal direct using the backward reference motion vector of the co-located block. In contrast, when the co-located block is the forward reference block, the temporal direct vector calculation unit 209 derives the candidate predicted motion vector (the temporal direct vector 1) the temporal direct using the backward reference motion vector of the co-located block. When the co-located block does not have the backward reference motion vector, the temporal direct vector calculation unit 209 derives the candidate predicted motion vector (the temporal direct vector 1) in the temporal direct using the forward reference motion vector of the co-located block. The inter prediction control unit 208 determines, from among the candidate predicted motion vectors, a motion vector to be used in performing inter prediction, based on a predicted motion vector index. Moreover, the inter prediction control unit 208 calculates a motion vector to be used in performing inter prediction by adding the prediction error information of the candidate predicted motion vector to a value of the determined candidate predicted motion vector.

At the end, the decoded prediction picture data and the prediction error picture data are added up to generate a decoded picture sequence.

Figure 14:
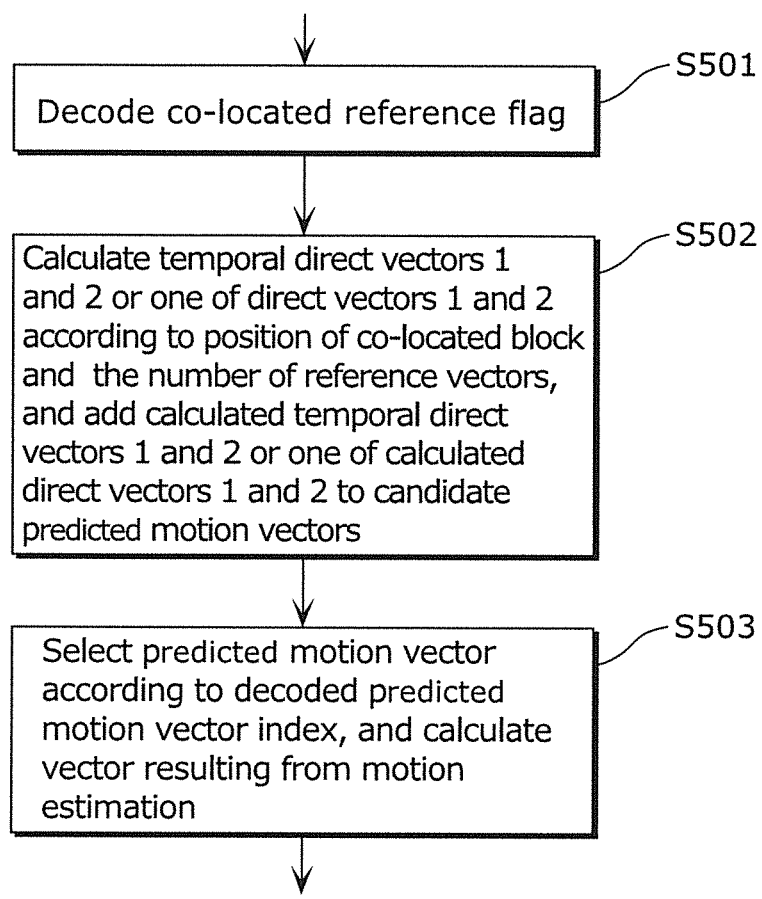
FIG. 14 shows an outline of a process flow of the moving picture decoding method according to an implementation of the present invention.

FIG. 14 shows an outline of a process flow of the moving picture decoding method according to an implementation of the present invention. In step S501, the variable-length decoding unit 201 decodes the co-located reference flag in units of pictures.

In step S502, the temporal direct vector calculation unit 209 determines, based on the co-located reference flag, whether the forward reference block will be the co-located block or the backward reference block will be the co-located block. The temporal direct vector calculation unit 209 derives a candidate predicted motion vector in temporal direct using a reference motion vector of the co-located block. When the co-located block has two forward reference motion vectors or two backward reference motion vectors, candidate predicted motion vectors (the temporal direct vector 1 and the temporal direct vector 2) are derived in the temporal direct using two motion vectors of the co-located block. Moreover, the temporal direct vector calculation unit 209 assigns corresponding values of predicted motion vector indexes to the temporal direct vector 1 and the temporal direct vector 2, respectively. A method for assigning a predicted motion vector index is the same as in Embodiment 1. When the co-located block does not have the two forward reference motion vectors or the two backward reference motion vectors, the temporal direct vector calculation unit 209 determines the motion vector of the co-located block, which is to be used in temporal direct, depending on whether the co-located block is the forward reference block or the backward reference block. When the co-located block is the backward reference block, the temporal direct vector calculation unit 209 derives the candidate predicted motion vector (the temporal direct vector 1) in the temporal direct using the forward reference motion vector of the co-located block. When the co-located block does not have the backward reference motion vector, the temporal direct vector calculation unit 209 derives the candidate predicted motion vector (the temporal direct vector 1) in the temporal direct using the forward reference motion vector of the co-located block. In contrast, when the co-located block is the forward reference block, the temporal direct vector calculation unit 209 derives the candidate predicted motion vector (the temporal direct vector 1) in the temporal direct using the backward reference motion vector of the co-located block. When the co-located block does not have the backward reference motion vector, the temporal direct vector calculation unit 209 derives the candidate predicted motion vector (the temporal direct vector 1) in the temporal direct using the forward reference motion vector of the co-located block.

In step S503, the inter prediction control unit 208 determines, from among the candidate predicted motion vectors, a candidate motion vector to be used in performing inter prediction, based on a predicted motion vector index. Moreover, the inter prediction control unit 208 derives a motion vector by adding error information to the determined candidate predicted vector. Decoding is performed through inter prediction using the derived motion vector.

As described above, this embodiment makes it possible to select a motion vector most suitable for the current block, and thus to properly decode a bit stream compressed with high efficiency.

Moreover, this embodiment makes it possible to narrow down to the candidate predicted motion vector with high accuracy by selecting the reference motion vector of the co-located block, which is to be used in temporal direct, depending on the position of the co-located block and the number of the reference motion vectors of the co-located block, and thus to reduce processing loads. More specifically, when the co-located block has referred forward twice or backward twice, it is highly likely that accuracy of the candidate predicted motion vectors (the temporal direct vectors 1 and 2) derived in temporal direct using the two motion vectors of the co-located block is approximated. Consequently, in this case, both of the motion vectors are added to the candidate predicted motion vectors. On the other hand, when the co-located block has the forward reference motion vector and the backward reference motion vector, a motion vector to be used in temporal direct is selected depending on the position of the co-located block. When the co-located block is the backward reference block, the forward reference motion vector is used. This is because the forward reference motion vector is a motion vector in a direction from a picture including the co-located block to a picture including a current block and is highly likely to have a prediction error smaller than that of the backward reference motion vector. In contrast, when the co-located block is the forward reference block, the backward reference motion vector is used. This is because the backward reference motion vector is the motion vector in the direction from the picture including the co-located block to the picture including the current block and is highly likely to have the prediction error smaller than that of the forward reference motion vector.

It is to be noted that although it is determined whether the co-located block has referred forward twice or backward twice in this embodiment, the position of the co-located block may be further determined simultaneously. More specifically, when the co-located block is the forward reference block, it is determined whether the co-located block has referred forward twice, or when the co-located block is the backward reference block, it is determined whether the co-located block has referred backward twice. When the co-located block is the backward reference block, the backward reference motion vector is a motion vector in a direction from the picture including co-located block to a picture opposite to the picture including the current block. As a result, prediction accuracy of the backward reference motion vector is reduced. In such a case, the prediction accuracy is increased by deriving both of the temporal direct vectors 1 and 2. As stated above, it is possible to reduce a processing amount while increasing the prediction accuracy by calculating the temporal direct vectors 1 and 2 only when the prediction accuracy is reduced.

Moreover, in stead of determining whether the co-located block has referred forward twice or backward twice, it may be determined whether or not a method for assigning a reference picture index to a reference picture is the same for the reference lists L1 and L2. Generally speaking, the reference picture index is assigned to a picture located after a current picture in display time order in the reference list L2. In contrast, the reference picture index is assigned to a picture located before the current picture in display time order in the reference list L1. Consequently, when the method for assigning a reference picture index to a reference picture is the same for the reference lists L1 and L2, a reference direction is limited to one of a forward direction and a backward direction in display order with respect to the current picture. As stated above, it is possible to reduce the processing amount by making the determination based on the reference lists. This is because the determination may be made per picture since the reference picture indexes are assigned to the respective pictures in the reference lists, and the determination does not need to be made per block.

Moreover, when the co-located block does not have the reference motion vector, assuming that another block is the co-located block, it is possible to calculate the temporal direct vector. For example, when the co-located block is the backward reference block and does not have the reference motion vector, it is conceivable that the forward reference block is the co-located block. In this case, it is possible to increase the prediction accuracy by using, among reference motion vectors of the forward reference block, a reference motion vector that is backward in display order. Moreover, when the forward reference block does not have the reference motion vector that is backward in display order, it is possible to derive the temporal direct vector by using a reference motion vector that is forward in display order. In contrast, when the co-located block is the forward reference block and does not have the reference motion vector, it is conceivable that the backward reference block is the co-located block. In this case, it is possible to increase the prediction accuracy by using, among reference motion vectors of the backward reference block, the reference motion vector that is forward in display order. Moreover, when the backward reference block does not have the reference motion vector that is forward in display order, it is possible to derive the temporal direct vector by using the reference motion vector that is backward in display order. It is to be noted that the co-located block is a block in a picture whose value of an index is "0" in a reference picture list L0 of a current picture. Consequently, when the co-located block identified by the value "0" of the index in the reference picture list L0 does not have a reference motion vector, it is conceivable to use a reference motion vector of a co-located block identified by the value "0" of an index in a reference picture list L1.

Embodiment 4

The processing described in each of Embodiments can be simply implemented in an independent computer system, by recording, in a recording medium, a program for implementing a configuration of the moving picture coding method (an image coding method) or the moving picture decoding method (an image decoding method) described in each of Embodiments. The recording media may be any recording media as long as the program can be recorded, such as a magnetic disk, an optical disk, a magnetic optical disk, an IC card, and a semiconductor memory.

Hereinafter, the applications to the moving picture coding method (the image coding method) and the moving picture decoding method (the image decoding method) described in each of Embodiments and systems using them will be described. The system includes an image coding and decoding apparatus which includes an image coding apparatus using the image coding method and an image decoding apparatus using the image decoding method. Other elements of the system can be appropriately changed depending on a situation.

Figure 15:
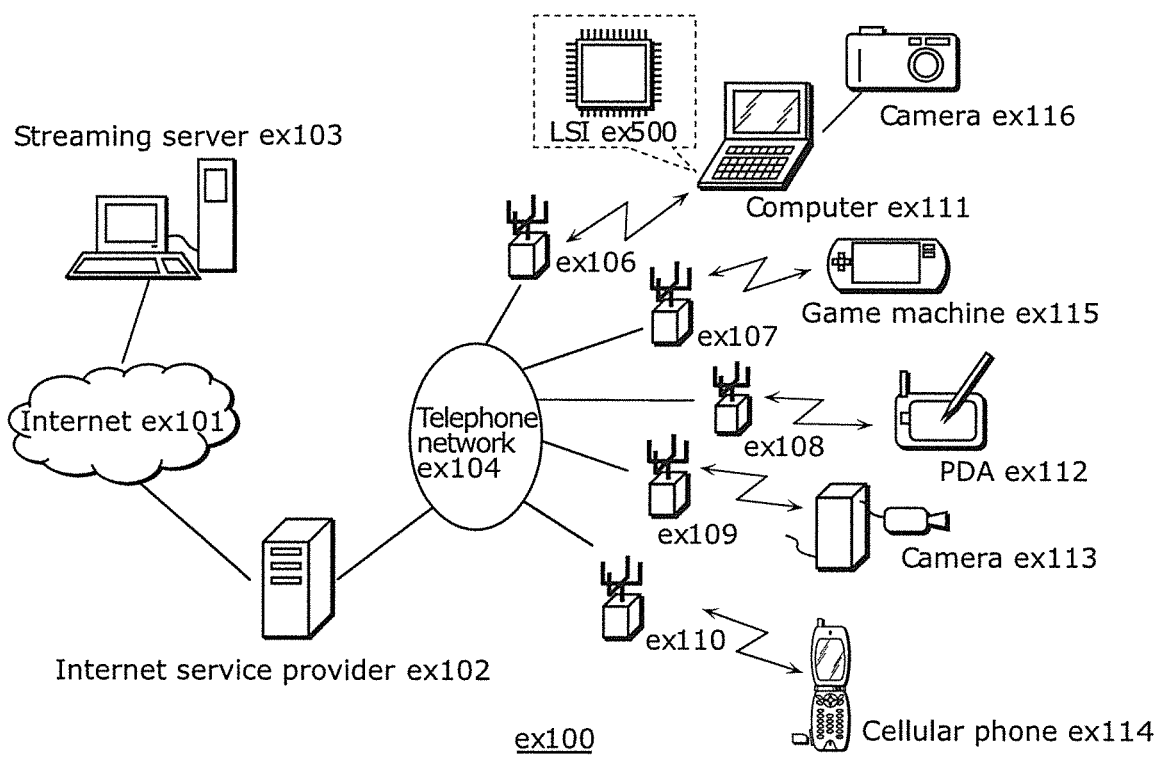
FIG. 15 is a diagram showing an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM™), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded (that is, the content providing system ex100 functions as an image coding apparatus according to an implementation of the present invention) as described above in each of Embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, the content providing system ex100 functions as an image decoding apparatus according to an implementation of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
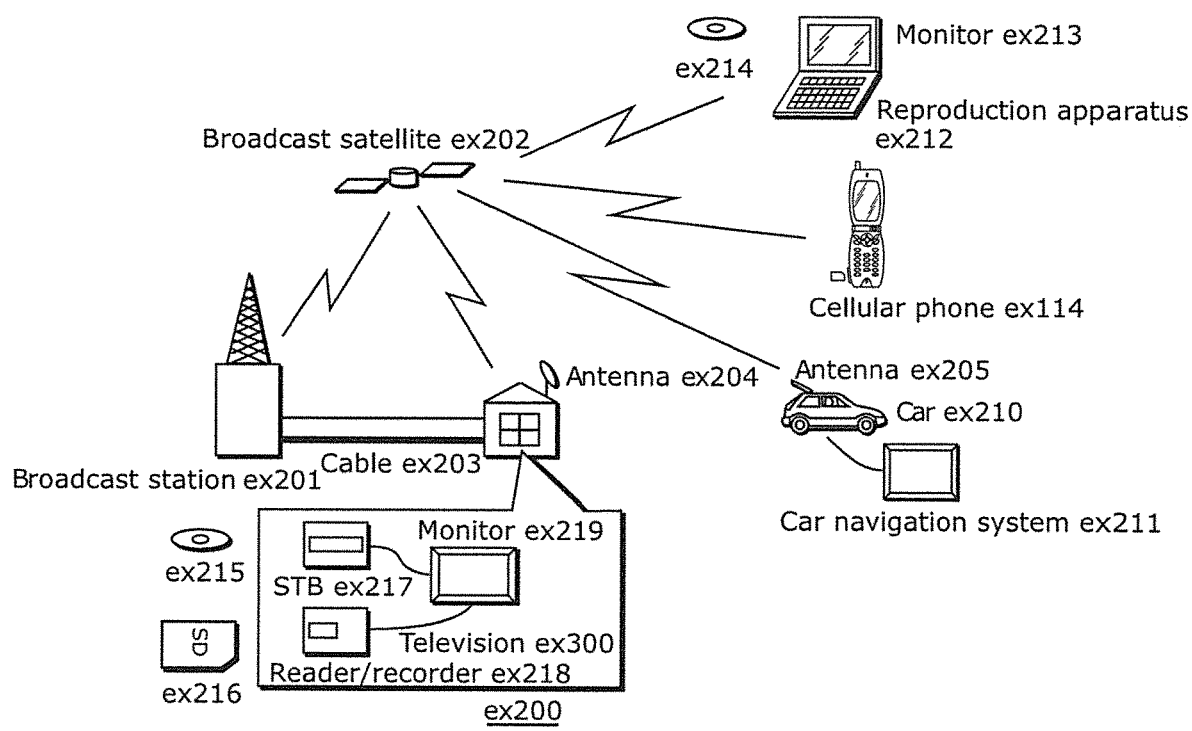
FIG. 16 is a diagram showing an overall configuration of a digital broadcasting system.

Aside from the example of the content providing system ex100, at least one of the moving picture coding apparatus (the image coding apparatus) and the moving picture decoding apparatus (the image decoding apparatus) described in each of Embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (that is, data coded by the image coding apparatus according to an implementation of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (that is, the device functions as the image decoding apparatus according to an implementation of the present invention).

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
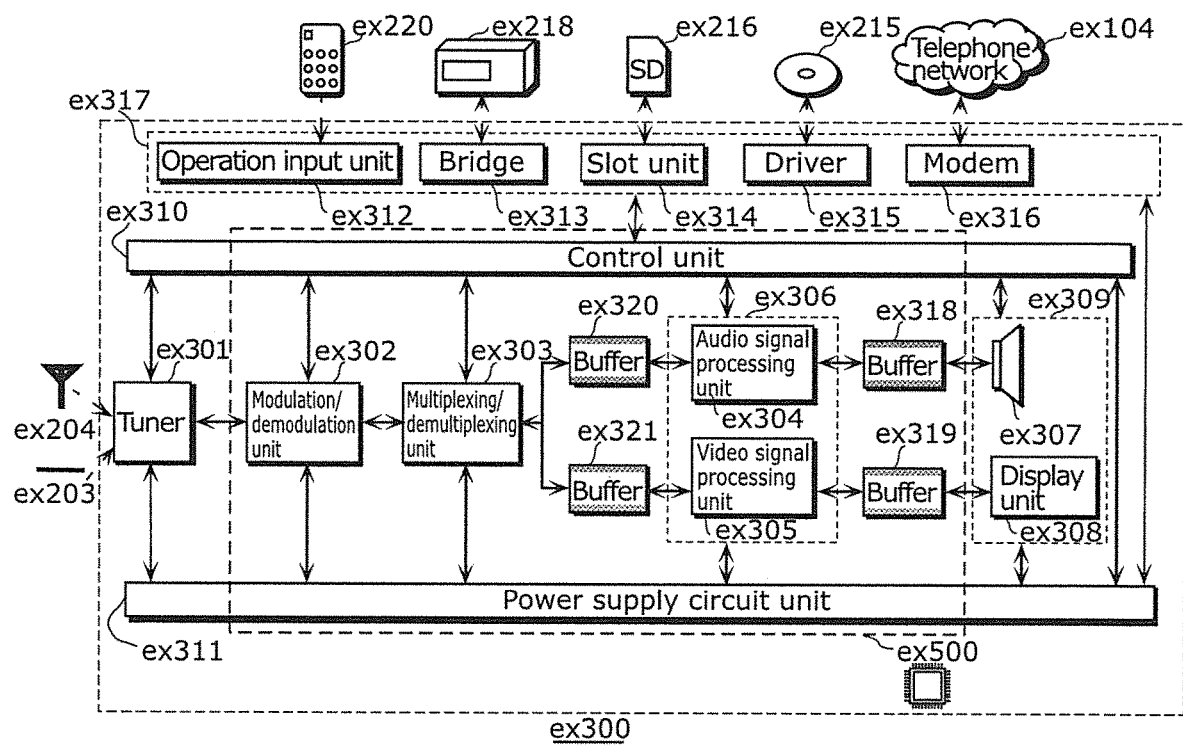
FIG. 17 is a block diagram showing an example of a configuration of a television.

FIG. 17 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (that function as the image coding apparatus and the image decoding apparatus, respectively, according to an implementation of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, although not illustrated, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
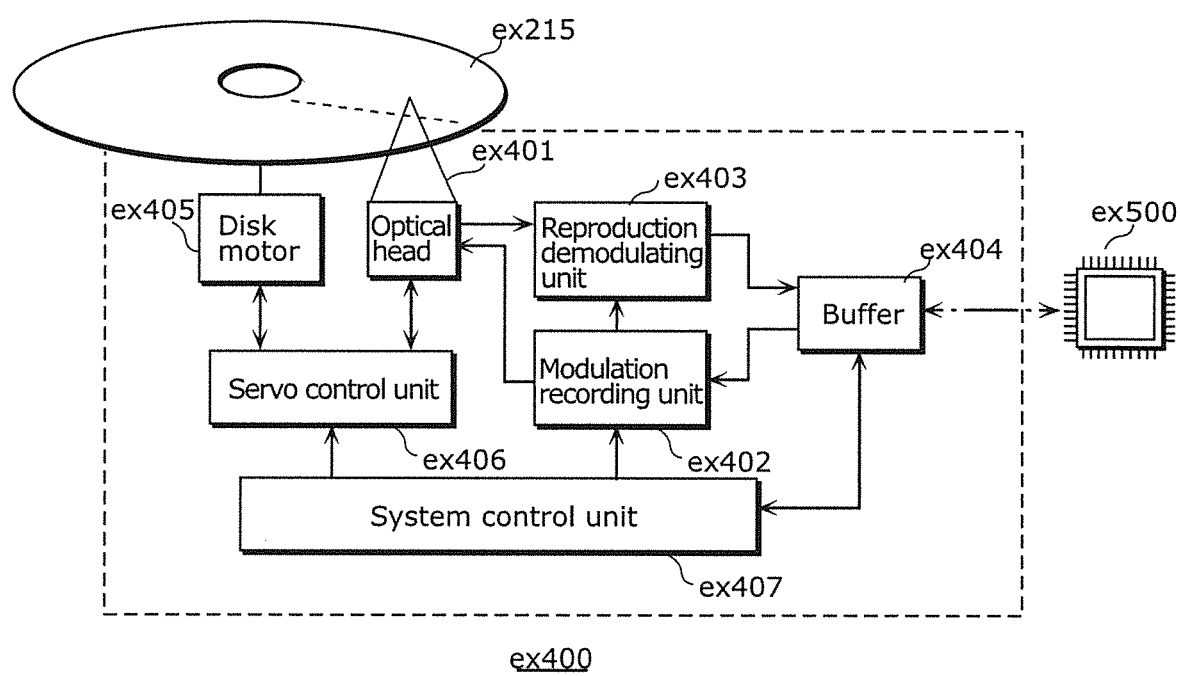
FIG. 18 is a block diagram showing an example of a configuration of an information reproducing/recording unit that reads and writes information from or on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
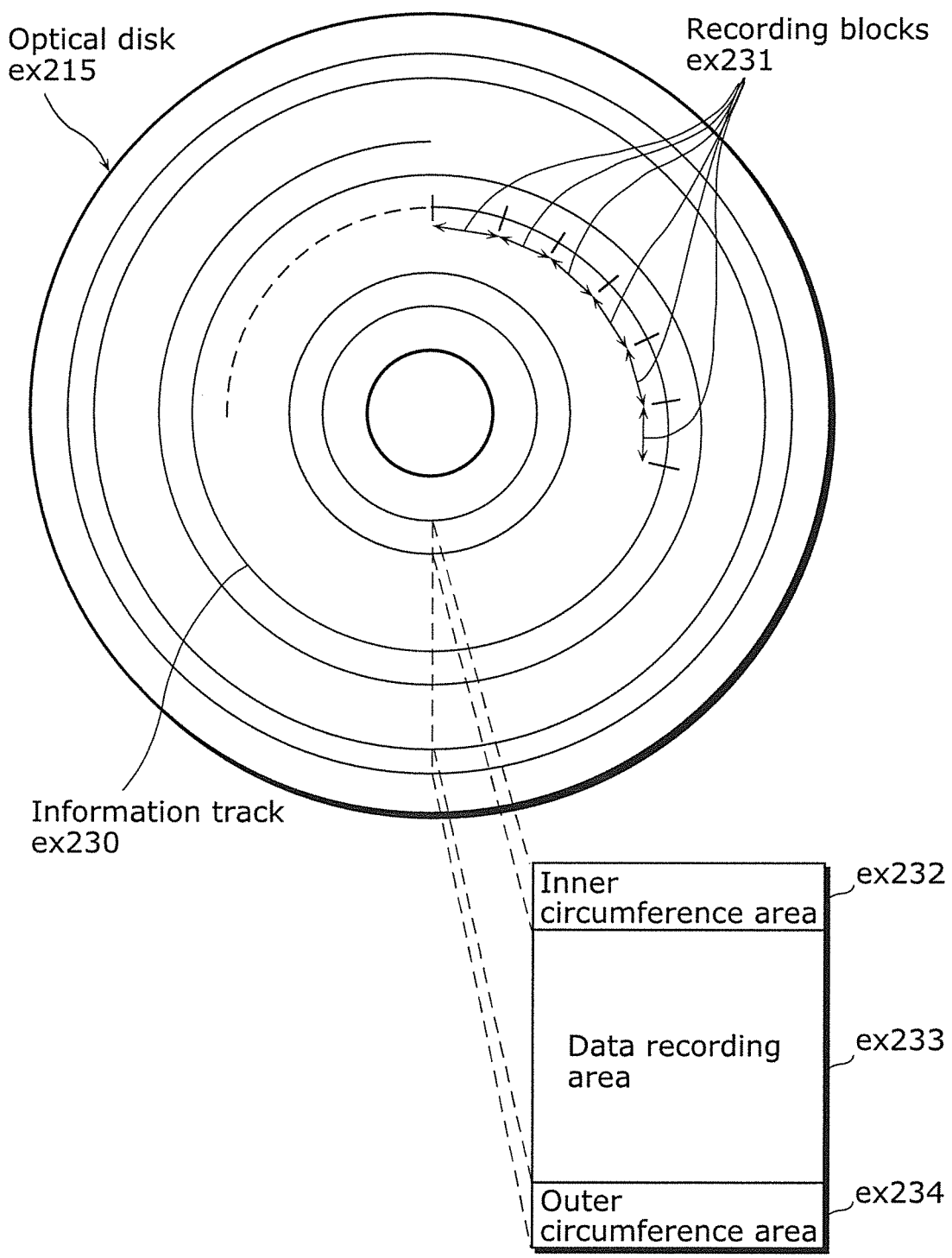
FIG. 19 is a diagram showing an example of a structure of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively, are for specific use except for recording the user data. The information reproducing/recording unit 400 reads and writes coded audio, coded video data, or multiplexed data obtained by multiplexing the coded audio and video data, from and in the data recording area ex233 of the recording medium ex215.

Although an optical disk having a single layer, such as a DVD and a BD, is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk, and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
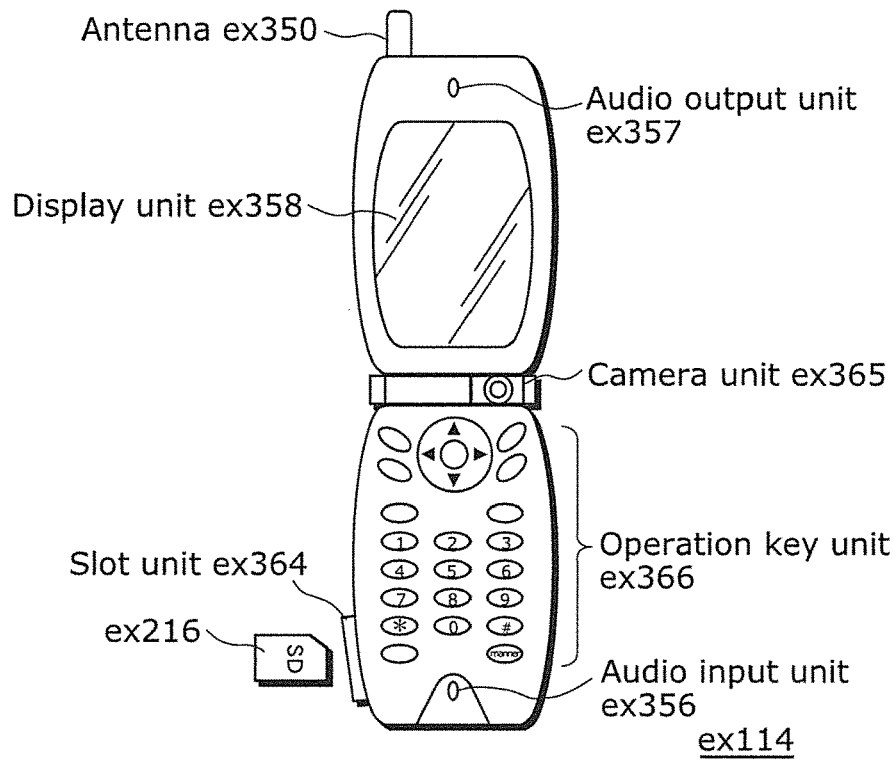
FIG. 20A is a diagram showing an example of a cellular phone.

FIG. 20A illustrates the cellular phone ex114 that uses the moving picture coding method or the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
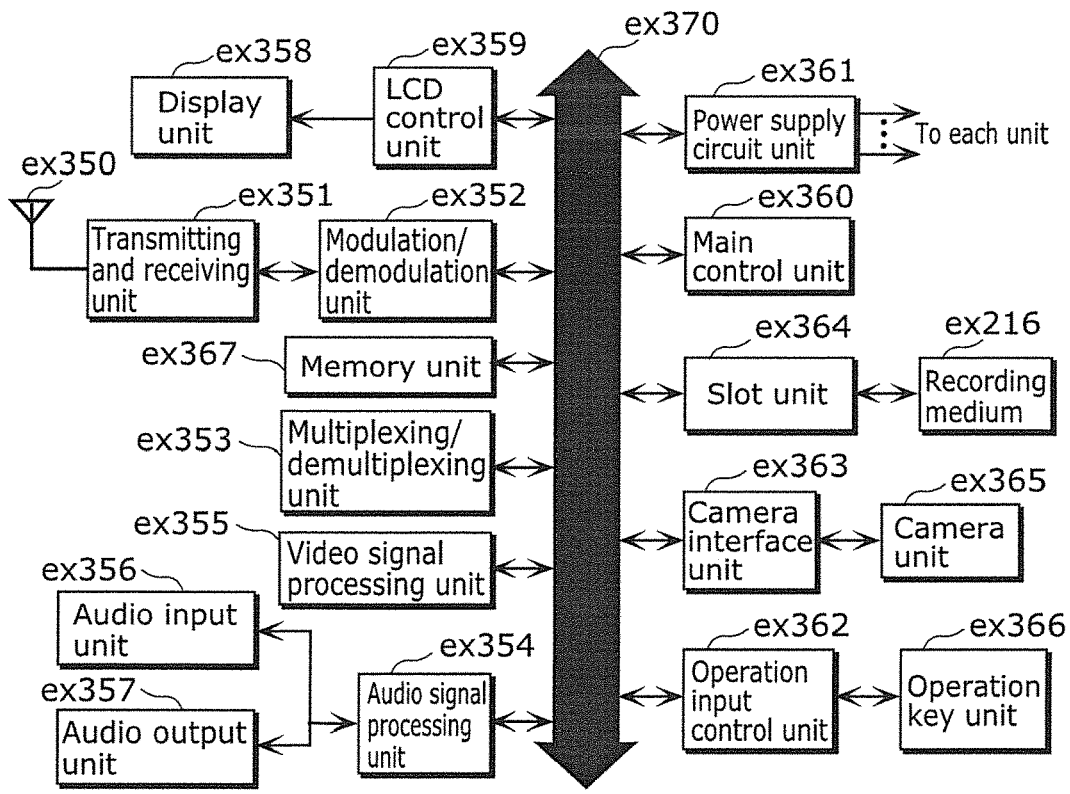
FIG. 20B is a block diagram showing an example of a structure of the cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail is transmitted in data communication mode, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio are transmitted in data communication mode, the video signal processing unit ex355 compresses and codes video signals supplied from the camera unit ex365 using the moving picture coding method shown in each of Embodiments (that is, functions as the image coding apparatus according to an implementation of the present invention), and transmits the coded video data to the multiplexing/demultiplexing unit ex353. In contrast, while the camera unit ex365 is capturing video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation circuit unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the coding method shown in each of Embodiments (that is, functions as the image decoding apparatus according to an implementation of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 5

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 21 is a diagram showing a structure of multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 22:
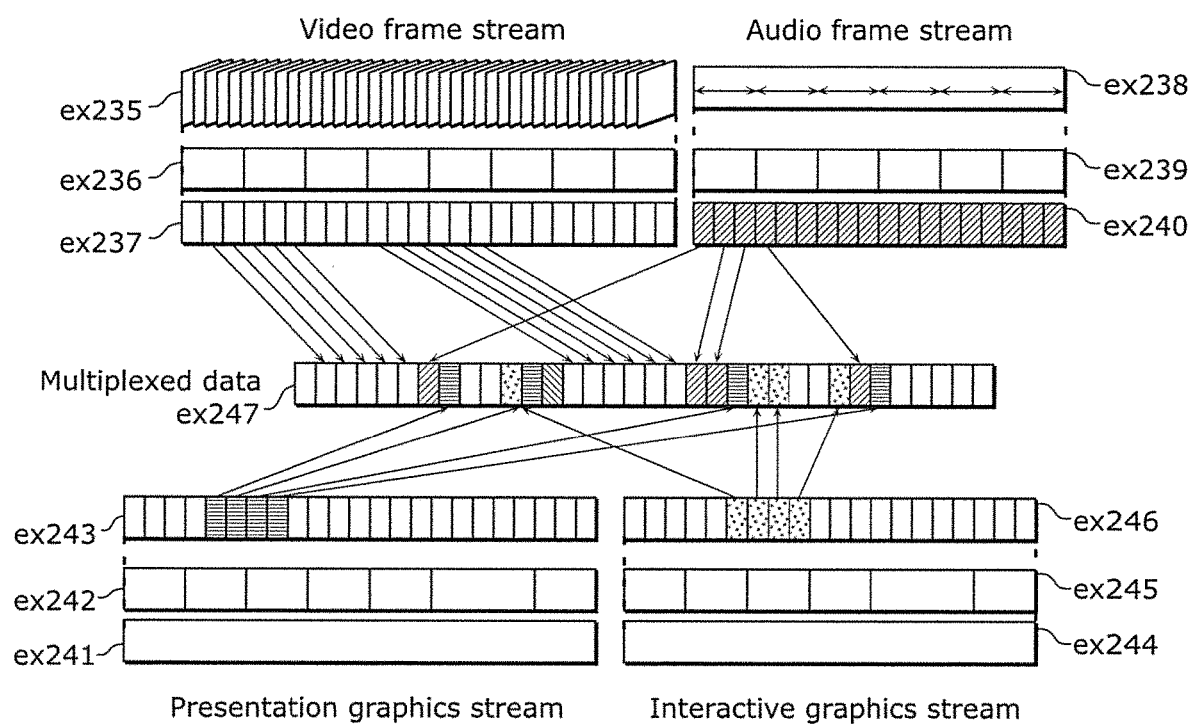
FIG. 22 is a diagram schematically showing how each of streams is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
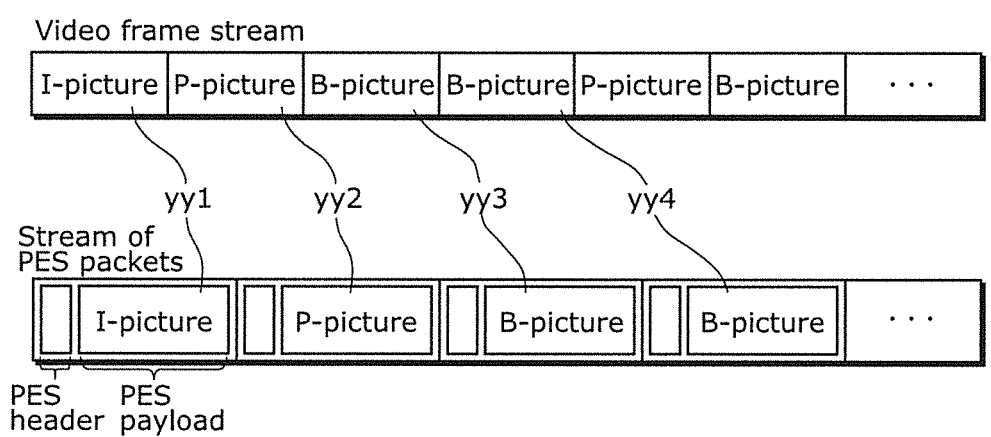
FIG. 23 is a diagram showing how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 24 illustrates a format of TS packets to be finally written on the multiplexed data. Each of the TS packets is a 188-byte fixed length packet including a 4-byte TS header having information, such as a PID for identifying a stream, and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
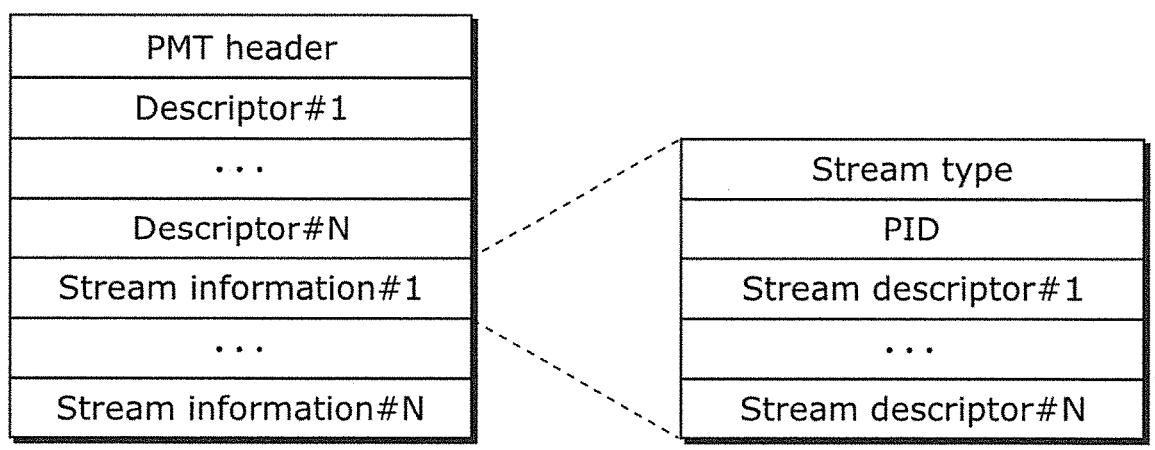
FIG. 25 is a diagram showing a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
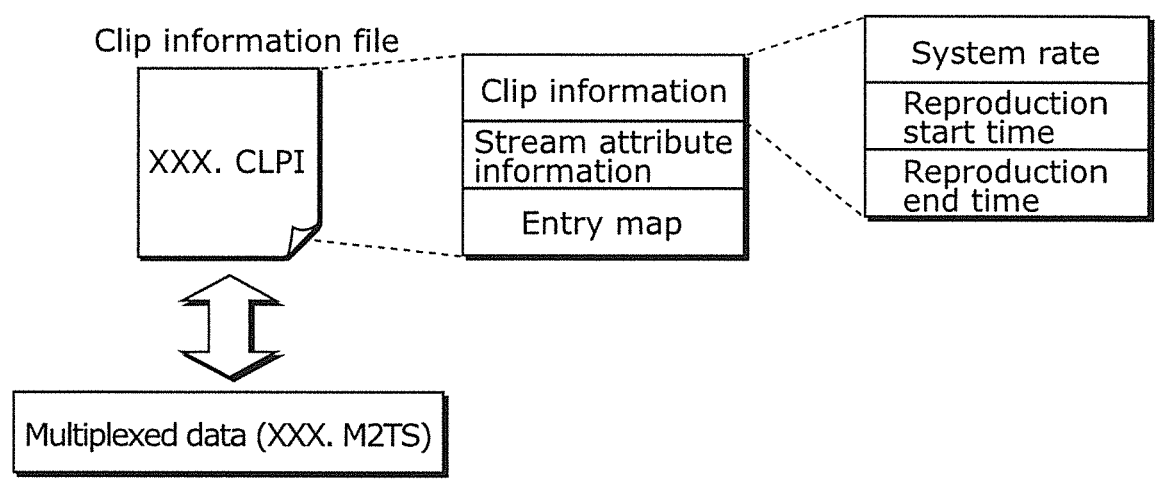
FIG. 26 is a diagram showing an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
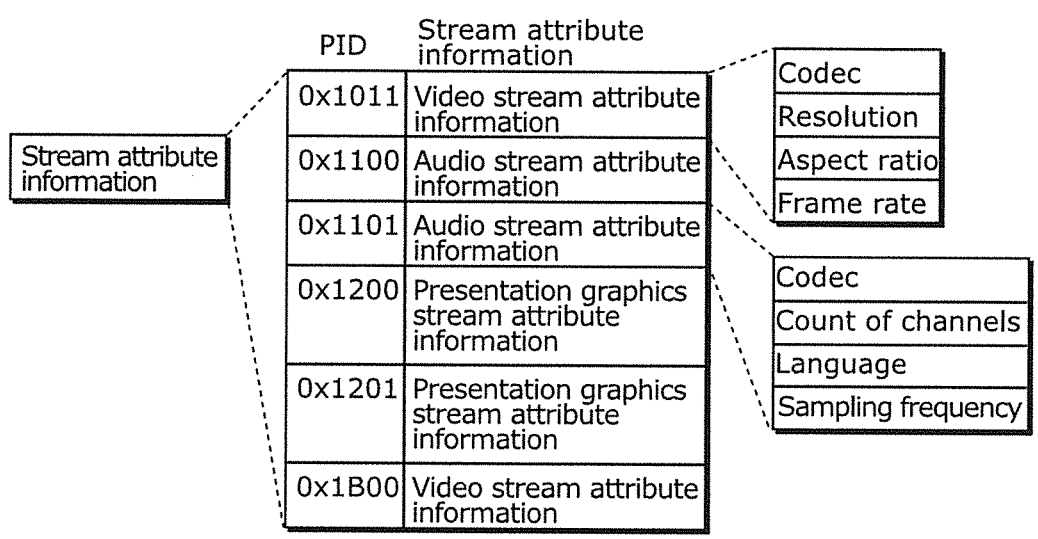
FIG. 27 is a diagram showing an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information indicating, for example, what kind of compression codec is used for compressing the audio stream, how many channels are included in the audio stream, which language the audio stream supports, and what the sampling frequency is. The video stream attribute information and the audio stream attribute information are used for initialization of a decoder before the player plays back the information.

In Embodiment 5, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 28:
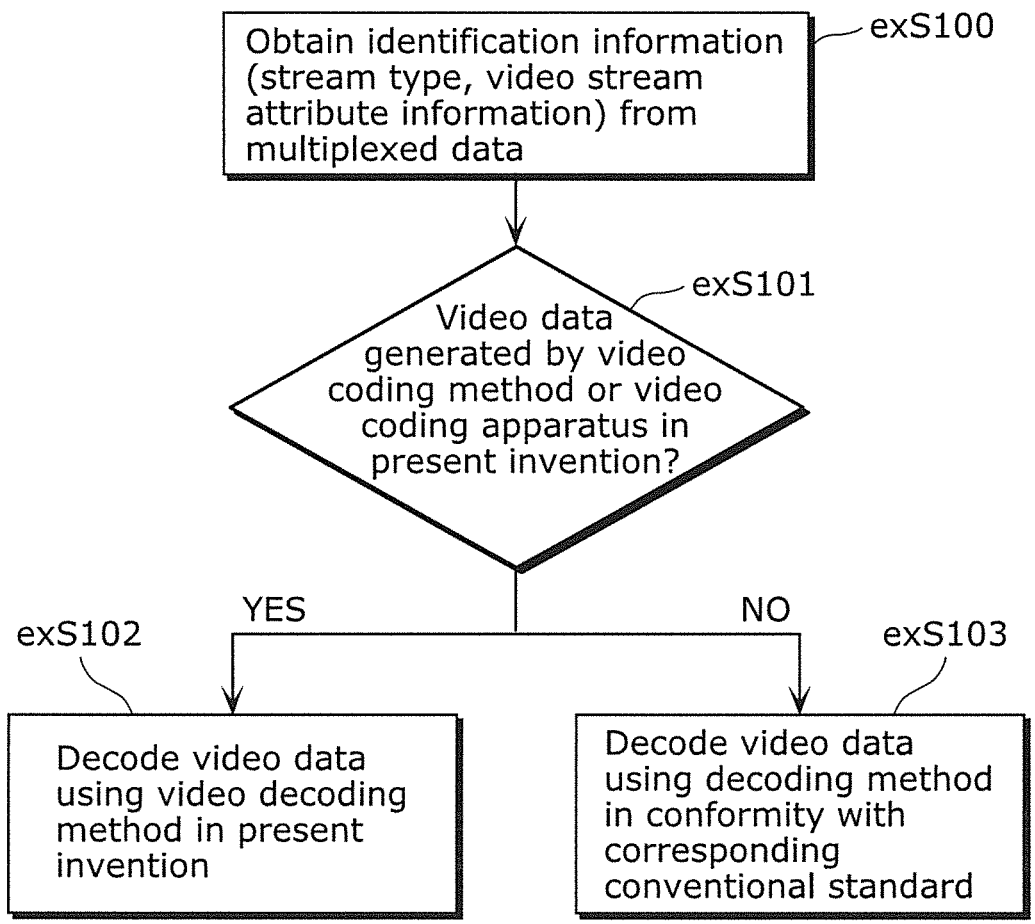
FIG. 28 is a flowchart showing steps for identifying video data.

Furthermore, FIG. 28 illustrates steps of the moving picture decoding method according to this embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard is inputted, an appropriate decoding method or apparatus can be selected. Thus, it becomes possible to decode information without any error. Furthermore, the moving picture coding method or apparatus or the moving picture decoding method or apparatus in Embodiment 5 can be used in the devices and systems described above.

Embodiment 6

Figure 29:
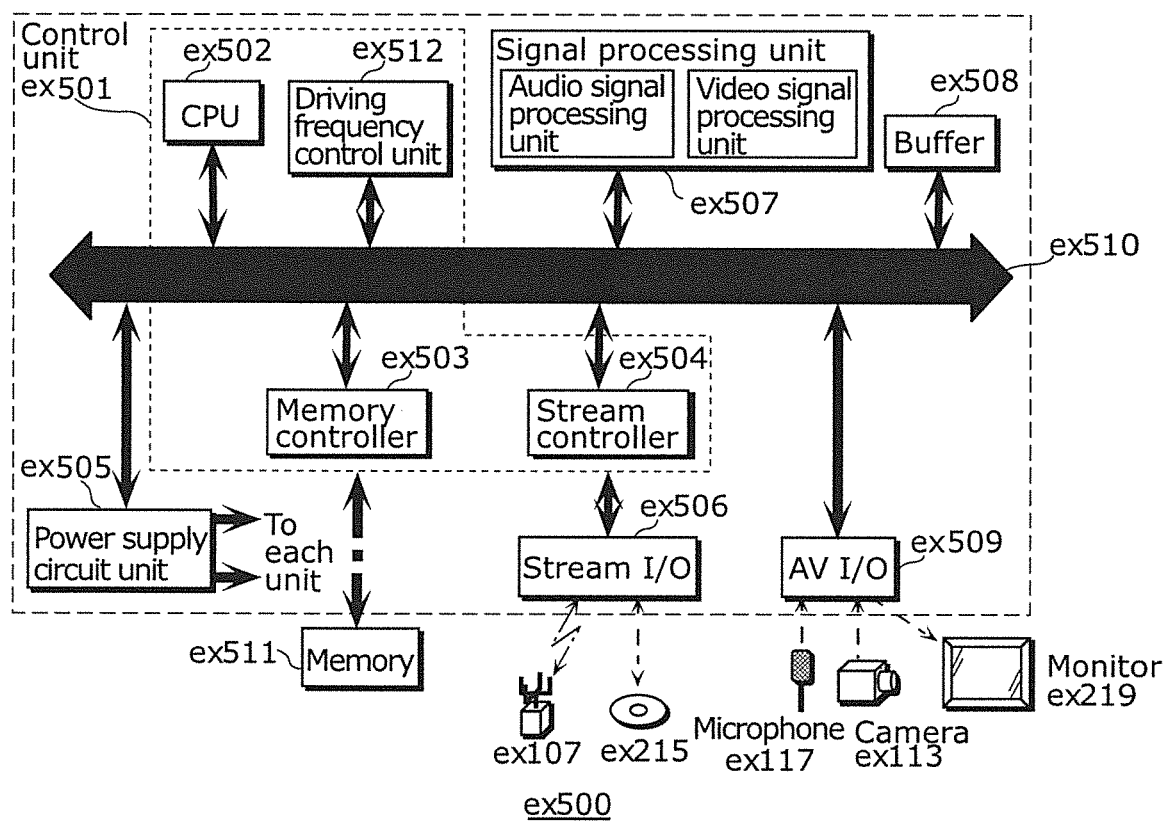
FIG. 29 is a block diagram showing an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV I/O ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream I/O ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500 in the above description, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, and so on, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as the signal processing unit ex507 or may include, for instance, an audio signal processing unit that is a part of the signal processing unit ex507. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
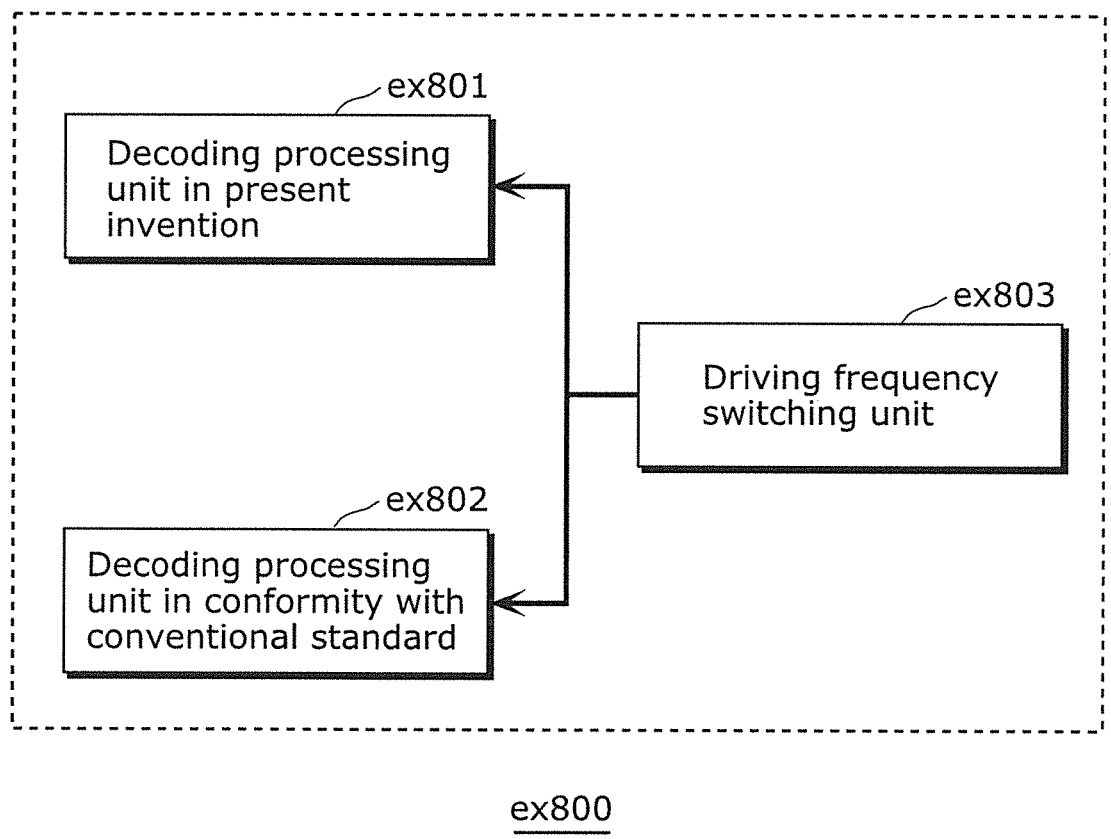
FIG. 30 is a block diagram showing a configuration for switching between driving frequencies.

In order to solve the problem, the moving picture decoding apparatus, such as the television ex300 and the LSI ex500, is configured to determine to which standard the video data conforms, and switch between the driving frequencies according to the determined standard. FIG. 30 illustrates a configuration ex800 in Embodiment 7. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data is the video data that conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 29. Here, each of the decoding processing unit ex801 that executes the moving picture decoding method described in each of Embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when it is possible to determine to which standard the video data conforms, based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

Figure 31:
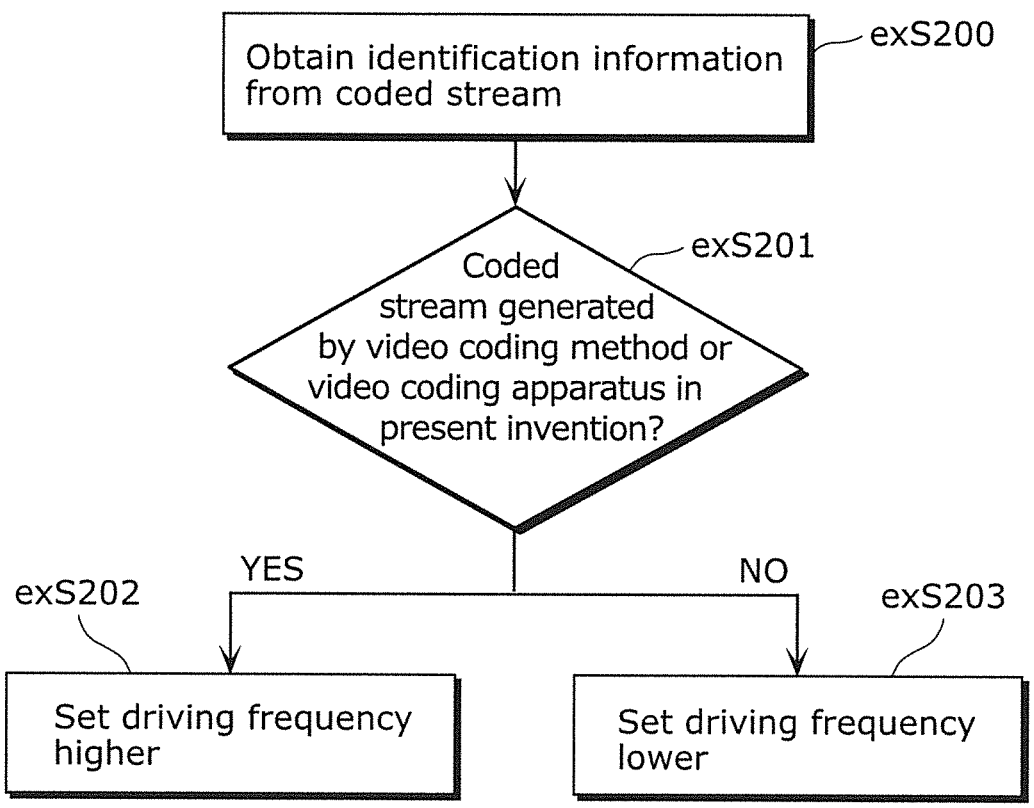
FIG. 31 is a flowchart showing steps for identifying video data and switching between driving frequencies.

FIG. 31 illustrates steps for executing a method in Embodiment 7. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method or the moving picture coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set a lower voltage than that in the case where the driving frequency is set higher.

Furthermore, in a method for setting a driving frequency, when the processing amount for decoding is larger, the driving frequency may be set higher, and when the processing amount for decoding is smaller, the driving frequency may be set lower. Thus, the setting method is not limited to the ones described above. For example, when the processing amount for decoding video data in conformity with MPEG-AVC is larger than the processing amount for decoding video data generated by the moving picture coding method or the moving picture coding apparatus described in each of Embodiments, the driving frequency is probably set in reverse order to the setting described above.

Furthermore, the method for setting a driving frequency is not limited to setting a driving frequency lower. For example, when the identification information indicates that the video data is generated by the moving picture coding method or the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method or the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method or the moving picture coding apparatus described in each of Embodiments, in the case where the CPU ex502 has extra processing capacity, the driving of the CPU ex502 is probably suspended at a given time. In such a case, the suspending time is probably set shorter than that in the case where the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards is provided to the devices and systems, such as a television and a mobile phone. In order to enable decoding the plurality of video data that conforms to the different standards even when the plurality of video data is inputted, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 33A:
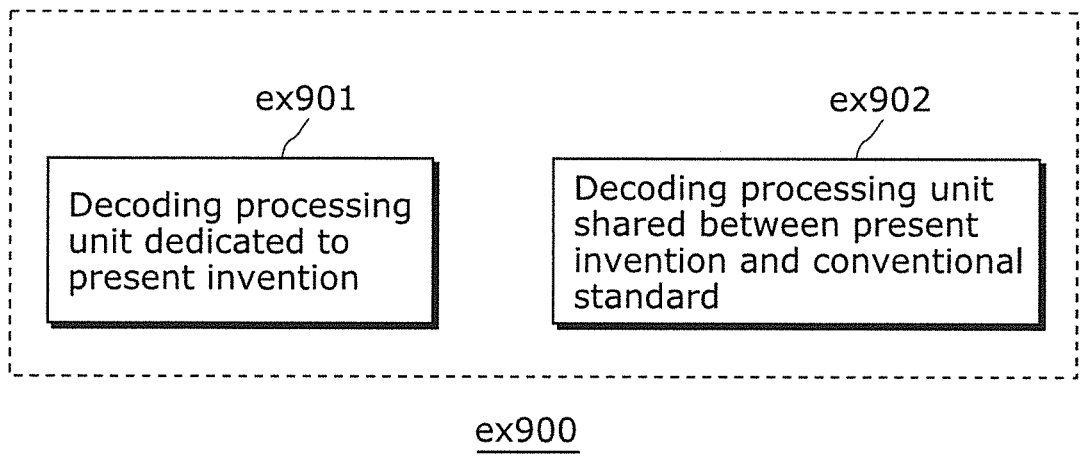
FIG. 33A is a diagram showing an example of a configuration for sharing a module of a signal processing unit.

In order to solve the problems, what is conceived is a configuration in which the decoding processing unit for implementing the moving picture decoding method described in each of Embodiments and the decoding processing unit that conforms to the conventional standard, such as MPEG-2, MPEG4-AVC, and VC-1, are partly shared. Ex900 in FIG. 33A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing that does not conform to MPEG4-AVC and is unique to the present invention. The decoding processing unit for implementing the moving picture decoding method described in each of Embodiments may be shared for the processing to be shared, and a dedicated decoding processing unit may be used for processing unique to that of MPEG4-AVC.

Figure 33B:
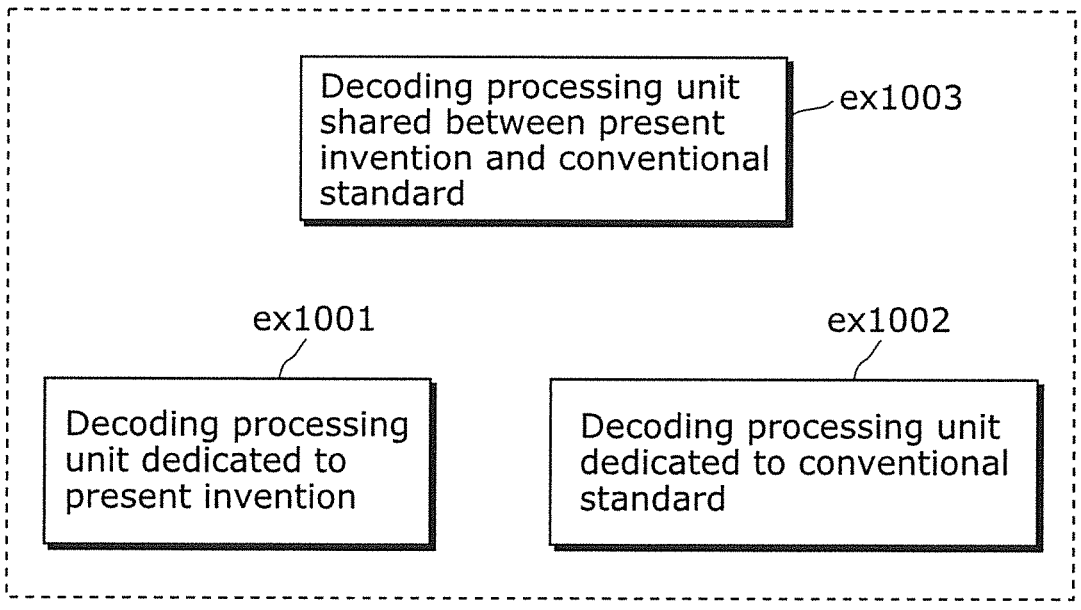
FIG. 33B is a diagram showing another example of a configuration for sharing a module of a signal processing unit.

Furthermore, ex1000 in FIG. 33B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 8 can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The moving picture coding method and the moving picture decoding method according to an implementation of the present invention can be applied to every multimedia data, makes it possible to increase a compression rate, and are useful as a moving picture coding method and a moving picture decoding method in accumulation, transmission, communication, and so on performed using, for example, cellular phones, DVD devices, and personal computers.

What is claimed is:

1. A moving picture coding method of coding a current picture to be coded which is included in a moving picture, said moving picture coding method comprising:

selecting a first reference picture from among all reference pictures, the first reference picture temporally preceding the current picture in a display order and including a reference block having a first reference motion vector and a second motion vector, the all reference pictures being included in at least one of a first reference picture list and a second reference picture list;

deriving at least one candidate motion vector of the current picture using at least one of the first reference motion vector and the second reference motion vector, and adding the at least one candidate motion vector into a candidate list; and coding the current picture using at least one motion vector selected from the candidate list, wherein said deriving and adding includes:

deriving, when the all reference pictures are determined to temporally precede the current picture in the display order, two candidate motion vectors of the current picture from the first reference motion vector and the second reference motion vector, respectively, by scaling the first reference motion vector and the second reference motion vector; and deriving, when the all reference pictures are determined to include a reference picture temporally preceding the current picture in the display order and a reference picture temporally preceded by the current picture in the display order, one candidate motion vector from one of the first reference motion vector and the second reference motion vector.

2. A moving picture coding apparatus that codes a current picture to be coded which is included in a moving picture, said moving picture coding apparatus comprising:

one or more processors; and storage coupled to the one or more processors, wherein said one or more processors are configured to execute, using said storage:

selecting a first reference picture from among all reference pictures, the first reference picture temporally preceding the current picture in a display order and including a reference block having a first reference motion vector and a second motion vector, the all reference pictures being included in at least one of a first reference picture list and a second reference picture list;

deriving at least one candidate motion vector of the current picture using at least one of the first reference motion vector and the second reference motion vector, and adding the at least one candidate motion vector into a candidate list; and coding the current picture using at least one motion vector selected from the candidate list, and said deriving and adding includes:

deriving, when the all reference pictures are determined to temporally precede the current picture in the display order, two candidate motion vectors of the current picture from the first reference motion vector and the second reference motion vector, respectively, by scaling the first reference motion vector and the second reference motion vector; and deriving, when the all reference pictures are determined to include a reference picture temporally preceding the current picture in the display order and a reference picture temporally preceded by the current picture in the display order, one candidate motion vector from one of the first reference motion vector and the second reference motion vector.

* * * * *